(12) United States Patent
Roundtree et al.

(10) Patent No.: US 9,883,326 B2
(45) Date of Patent: Jan. 30, 2018

(54) BEACON BASED PRIVACY CENTRIC NETWORK COMMUNICATION, SHARING, RELEVANCY TOOLS AND OTHER TOOLS

(71) Applicant: AutoGraph, Inc., Seattle, WA (US)

(72) Inventors: Brian Roundtree, Seattle, WA (US); Kevin Allan, Seattle, WA (US)

(73) Assignee: AutoGraph, Inc., Seattle, WA (US)

( * ) Notice: Subject to any disclaimer, the term of this patent is extended or adjusted under 35 U.S.C. 154(b) by 0 days.

(21) Appl. No.: 14/672,007

(22) Filed: Mar. 27, 2015

(65) Prior Publication Data

US 2015/0281878 A1 Oct. 1, 2015

Related U.S. Application Data

(60) Provisional application No. 61/972,193, filed on Mar. 28, 2014.

(51) Int. Cl.
*H04B 7/00* (2006.01)
*H04W 4/00* (2009.01)

(52) U.S. Cl.
CPC .................... *H04W 4/008* (2013.01)

(58) Field of Classification Search
CPC ............... H04W 4/02–4/025; H04W 40/244
See application file for complete search history.

(56) References Cited

U.S. PATENT DOCUMENTS

| | | |
|---|---|---|
| 5,991,735 A | 11/1999 | Gerace |
| 6,603,969 B1 | 8/2003 | Vuoristo et al. |
| 6,611,842 B1 | 8/2003 | Brown |
| 7,062,510 B1 * | 6/2006 | Eldering ............... G06Q 30/02 |
| 7,610,255 B2 | 10/2009 | Willcock et al. |
| 7,660,737 B1 | 2/2010 | Lim et al. |
| 7,707,171 B2 | 4/2010 | Willcock et al. |
| 7,809,740 B2 | 10/2010 | Chung et al. |
| 7,904,442 B2 | 3/2011 | Bahn et al. |
| 7,942,319 B2 | 5/2011 | Bezancon |
| 8,108,245 B1 | 1/2012 | Hosea et al. |
| 8,131,592 B2 | 3/2012 | Gordon |
| 8,150,430 B2 | 4/2012 | Sennett et al. |
| 8,150,731 B1 | 4/2012 | Whitten et al. |
| 8,150,930 B2 | 4/2012 | Satterfield et al. |
| 8,308,977 B2 | 11/2012 | Gildfind |

(Continued)

FOREIGN PATENT DOCUMENTS

| | | |
|---|---|---|
| CN | 101286173 | 10/2008 |
| CN | 102016904 | 4/2011 |

(Continued)

OTHER PUBLICATIONS

The Donohue Report, Aug. 20, 2014. "Online Shared Movie Experience," by Betsy Pray. <donahuereport.com>, 3 pages.

(Continued)

*Primary Examiner* — Zhiyu Lu
(74) *Attorney, Agent, or Firm* — Perkins Coie LLP

(57) ABSTRACT

The disclosed tools use a plurality of substantially low powered data signal transmitters and receiving tools, such as beacons to provide a location and contextually aware system. Specifically, the disclosed technology can greatly enhance personalization of information or advertising that is delivered to a user via analyzing the proximity data that is transmitted by a beacon.

19 Claims, 9 Drawing Sheets

(56) References Cited

U.S. PATENT DOCUMENTS

| | | | |
|---|---|---|---|
| 8,370,330 B2 | 2/2013 | Priyadarshan et al. | |
| 8,572,711 B1 | 10/2013 | Klau et al. | |
| 8,650,141 B2 | 2/2014 | Willcock et al. | |
| 8,707,319 B2 | 4/2014 | Nguyen et al. | |
| 8,739,254 B2 | 5/2014 | Aaron | |
| 8,751,430 B2 | 6/2014 | Willcock et al. | |
| 8,755,823 B2 | 6/2014 | Proletti et al. | |
| 8,847,733 B2 | 9/2014 | Khan et al. | |
| 9,183,203 B1 | 11/2015 | Tuchman et al. | |
| 2002/0123368 A1 | 9/2002 | Yamadera et al. | |
| 2002/0140728 A1 | 10/2002 | Zimmerman et al. | |
| 2003/0055722 A1 | 3/2003 | Perreault et al. | |
| 2003/0061607 A1 | 3/2003 | Hunter et al. | |
| 2003/0157963 A1* | 8/2003 | Collot | G06Q 10/10 455/557 |
| 2004/0014486 A1* | 1/2004 | Carlton | G06Q 30/02 455/550.1 |
| 2004/0024739 A1 | 2/2004 | Copperman et al. | |
| 2004/0049673 A1 | 3/2004 | Song et al. | |
| 2004/0215692 A1 | 10/2004 | Vasudevan et al. | |
| 2004/0268265 A1 | 12/2004 | Berger et al. | |
| 2005/0131762 A1 | 6/2005 | Bharat et al. | |
| 2005/0216346 A1 | 9/2005 | Kusumoto et al. | |
| 2005/0240608 A1 | 10/2005 | Jones et al. | |
| 2005/0283796 A1 | 12/2005 | Flickinger | |
| 2006/0010400 A1 | 1/2006 | Dehlin et al. | |
| 2006/0242013 A1 | 10/2006 | Agarwal et al. | |
| 2006/0259360 A1 | 11/2006 | Flinn et al. | |
| 2007/0030824 A1* | 2/2007 | Ribaudo | G01S 5/0018 370/328 |
| 2007/0038931 A1 | 2/2007 | Allaire et al. | |
| 2007/0101276 A1 | 5/2007 | Yuen et al. | |
| 2007/0177554 A1 | 8/2007 | Yang et al. | |
| 2007/0184820 A1 | 8/2007 | Marshall | |
| 2007/0208679 A1 | 9/2007 | Tseng et al. | |
| 2007/0244872 A1 | 10/2007 | Hancock | |
| 2007/0257792 A1 | 11/2007 | Gold | |
| 2007/0260624 A1 | 11/2007 | Chung et al. | |
| 2008/0097867 A1 | 4/2008 | Engle | |
| 2008/0126175 A1 | 5/2008 | Alexander | |
| 2008/0147645 A1 | 6/2008 | O'Malley et al. | |
| 2008/0249987 A1* | 10/2008 | Ogasawara | G06F 17/30867 |
| 2008/0262908 A1 | 10/2008 | Broady et al. | |
| 2008/0270398 A1 | 10/2008 | Landau et al. | |
| 2008/0288331 A1 | 11/2008 | Magids et al. | |
| 2008/0290987 A1 | 11/2008 | Li | |
| 2009/0006214 A1 | 1/2009 | Lerman et al. | |
| 2009/0013268 A1 | 1/2009 | Amit | |
| 2009/0028434 A1 | 1/2009 | Vanhoucke et al. | |
| 2009/0089310 A1 | 4/2009 | Lara et al. | |
| 2009/0099932 A1 | 4/2009 | Ahopelto | |
| 2009/0106096 A1 | 4/2009 | Horowitz et al. | |
| 2009/0112714 A1 | 4/2009 | Steelberg et al. | |
| 2009/0132943 A1 | 5/2009 | Minsky et al. | |
| 2009/0182631 A1 | 7/2009 | Higgins et al. | |
| 2009/0182810 A1 | 7/2009 | Higgins et al. | |
| 2009/0234691 A1 | 9/2009 | Steelberg et al. | |
| 2009/0271256 A1 | 10/2009 | Toebes et al. | |
| 2009/0276453 A1 | 11/2009 | Trout et al. | |
| 2009/0276459 A1 | 11/2009 | Trout et al. | |
| 2009/0305667 A1 | 12/2009 | Schultz | |
| 2009/0319648 A1 | 12/2009 | Dutta et al. | |
| 2010/0057743 A1 | 3/2010 | Pierce | |
| 2010/0076838 A1 | 3/2010 | Steelberg et al. | |
| 2010/0094878 A1 | 4/2010 | Soroca et al. | |
| 2010/0161424 A1 | 6/2010 | Sylvain | |
| 2010/0169313 A1 | 7/2010 | Kenedy et al. | |
| 2010/0169803 A1 | 7/2010 | Mazzei et al. | |
| 2010/0179950 A1 | 7/2010 | Willcock et al. | |
| 2010/0218141 A1 | 8/2010 | Xu et al. | |
| 2010/0262497 A1 | 10/2010 | Karlsson | |
| 2010/0293036 A1 | 11/2010 | Meyer et al. | |
| 2010/0293569 A1 | 11/2010 | Kusumoto et al. | |
| 2010/0299140 A1 | 11/2010 | Witbrock et al. | |
| 2010/0299226 A1 | 11/2010 | Steelberg et al. | |
| 2010/0306702 A1 | 12/2010 | Warner | |
| 2010/0331016 A1 | 12/2010 | Dutton et al. | |
| 2011/0013528 A1 | 1/2011 | Chen | |
| 2011/0055017 A1 | 3/2011 | Solomon et al. | |
| 2011/0066497 A1 | 3/2011 | Gopinath et al. | |
| 2011/0072047 A1 | 3/2011 | Wang et al. | |
| 2011/0093780 A1 | 4/2011 | Dunn et al. | |
| 2011/0107433 A1 | 5/2011 | Steelberg et al. | |
| 2011/0126122 A1 | 5/2011 | Forman et al. | |
| 2011/0145039 A1 | 6/2011 | McCarney et al. | |
| 2011/0153429 A1 | 6/2011 | Ullah | |
| 2011/0161331 A1 | 6/2011 | Chung et al. | |
| 2011/0227790 A1* | 9/2011 | Li | G01S 1/042 342/386 |
| 2011/0282878 A1 | 11/2011 | Bird et al. | |
| 2011/0319059 A1 | 12/2011 | Padeh | |
| 2012/0005204 A1* | 1/2012 | Diaz | G06N 99/005 707/733 |
| 2012/0011112 A1* | 1/2012 | Bian | G06F 17/30864 707/723 |
| 2012/0036181 A1* | 2/2012 | Isidore | G06Q 50/01 709/203 |
| 2012/0158502 A1 | 6/2012 | Chung et al. | |
| 2012/0166433 A1 | 6/2012 | Tseng | |
| 2012/0200390 A1 | 8/2012 | Saravanan | |
| 2012/0209839 A1* | 8/2012 | Andrews | G06Q 10/10 707/728 |
| 2012/0209907 A1* | 8/2012 | Andrews | G06F 17/30867 709/204 |
| 2012/0323704 A1 | 12/2012 | Steelberg et al. | |
| 2013/0005352 A1 | 1/2013 | Jones et al. | |
| 2013/0018685 A1 | 1/2013 | Parnaby et al. | |
| 2013/0047123 A1 | 2/2013 | May et al. | |
| 2013/0054366 A1 | 2/2013 | Roundtree et al. | |
| 2013/0085847 A1 | 4/2013 | Dyor et al. | |
| 2013/0085849 A1 | 4/2013 | Dyor et al. | |
| 2013/0085855 A1 | 4/2013 | Dyor et al. | |
| 2013/0086499 A1 | 4/2013 | Dyor et al. | |
| 2013/0124628 A1 | 5/2013 | Weerasinghe | |
| 2013/0132194 A1 | 5/2013 | Rajaram et al. | |
| 2013/0144710 A1 | 6/2013 | Roundtree et al. | |
| 2013/0144711 A1 | 6/2013 | Roundtree et al. | |
| 2013/0151339 A1 | 6/2013 | Kim et al. | |
| 2013/0159110 A1 | 6/2013 | Rajaram et al. | |
| 2013/0161381 A1 | 6/2013 | Roundtree et al. | |
| 2013/0167085 A1* | 6/2013 | Roundtree | G06Q 30/0207 715/810 |
| 2013/0290106 A1 | 10/2013 | Bradley et al. | |
| 2013/0291123 A1 | 10/2013 | Rajkumar et al. | |
| 2013/0298147 A1 | 11/2013 | Klein et al. | |
| 2014/0046753 A1 | 2/2014 | Rabii et al. | |
| 2014/0052527 A1 | 2/2014 | Roundtree | |
| 2014/0087758 A1* | 3/2014 | Maor | G01S 5/0252 455/456.1 |
| 2014/0136606 A1 | 5/2014 | Roundtree | |
| 2014/0143250 A1 | 5/2014 | Martin et al. | |
| 2014/0201126 A1* | 7/2014 | Zadeh | G06K 9/627 706/52 |
| 2014/0201292 A1 | 7/2014 | Savage et al. | |
| 2014/0220883 A1* | 8/2014 | Emigh | H04H 20/61 455/3.01 |
| 2014/0278992 A1 | 9/2014 | Roundtree et al. | |
| 2015/0140982 A1* | 5/2015 | Postrel | H04W 4/008 455/418 |
| 2015/0181384 A1* | 6/2015 | Mayor | H04W 24/02 455/456.1 |
| 2015/0189028 A1* | 7/2015 | Sayed | H04W 4/206 709/204 |
| 2015/0193888 A1* | 7/2015 | Sayed | G06Q 50/01 705/319 |
| 2015/0242911 A1* | 8/2015 | Zises | G06Q 30/0267 705/14.64 |

FOREIGN PATENT DOCUMENTS

| | | |
|---|---|---|
| CN | 102073956 A | 5/2011 |
| EP | 2226719 A1 | 9/2010 |

(56) References Cited

FOREIGN PATENT DOCUMENTS

| JP | 63037727 | | 2/1988 |
|---|---|---|---|
| JP | 2002261918 | A | 9/2002 |
| JP | 2003223251 | A | 8/2003 |
| JP | 2006030482 | A | 2/2006 |
| WO | 2007035412 | A2 | 3/2007 |
| WO | 2007117979 | A2 | 10/2007 |
| WO | 2007117980 | A2 | 10/2007 |
| WO | 2008110504 | A2 | 9/2008 |
| WO | 2010018451 | | 2/2010 |
| WO | 2010119379 | A1 | 10/2010 |
| WO | WO-2012064860 | | 5/2012 |
| WO | 2015149032 | A1 | 10/2015 |

OTHER PUBLICATIONS

Gigaom, "Looking for an architecture for the internet of things? Try DNS," Nov. 4, 2014, <gigaom.com/2014/11/04/looking-for-an-architecture-for-the-internet-of-things-try-dns>, 5 pages.
International Searching Authority, International Search Report and Written Opinion, PCT Patent Application PCT/US2015/023191, dated Jul. 13, 2015, 11 pages.
Caballini, Andy (Gaia-Matrix). "iBeacons Bible 1.0", Reference 6 in http://en.wikipedia.org/wiki/IBeacon, Jan. 1, 2014, 14 pages.
"A service for measuring location-based public sentiment, in real-time." <http://web.archive.org/web/20110511150225/http://www.qriously.com/>, May 11, 2011, 3 pages.
"Express yourself now, start the quiz . . . " screenshot <youiverse.com>; date unknown 2012; accessed May 15, 2015, 1 page.
"Taxonomy"—www.vocabulary.com/dictionary.taxonomy; accessed on Jun. 4, 2015, 2 pages.
"VisualDNA Personality Quiz." <http://you.visualdna.com/quiz/personality>; date unknown 2012; accessed May 15, 2015, 1 page.
"VisualDNA Shops Product Walkthrough"—YouTube. <https://www.youtube.com/watch?v=-Uz-IbFmlDY> uploaded May 28, 2009. 1 page.
"What am I worth?" screenshot <http://3.bp.blogspot.com/-UA1s2bthzeE/TxV_oCt_N0I/AAAAAAAACpg/UY-kKxa3k7M/s1600/Worth1.png>; date unknown 2012; accessed May 15, 2015, 1 page.
Butcher, Mike. "ColourDNA App Builds New Kind of Interest Graph—Pinterest for Color?" <http://techcrunch.com/2012/03/27/colourdna-app-builds-new-kind-of-interest-graph-pinterest-for-color/>, Mar. 27, 2012, 11 pages.
Farmer, Aaron, The Retail Coach. "Psychographic Profile, Retail Trade Area, Liberty, Texas." Feb. 1, 2010, 32 pages.
Gift Finder—Find Gifts by Personality Type. <http://www.gifts.com/finder>; date unknown 2012; accessed May 15, 2015, 1 page.
Japanese Patent Office, Official Action, JP Patent Application 2014-514610, dated Jun. 2, 2016, 9 pages (including English translation).
Price, E. "Apple Patents the Virtual Page Turn." http://mashable.com/2012/11/16/apple-page-turn-patent/?utm_source=feedburner&utm_medium=email&utm_campaign=Feed%3A+Mashable+%28Mashable%29[mashable.com]>, Nov. 16, 2012, 2 pages.
VisionCritical. "Vision Critical's Visual Questions: What, when and why to use these question types." Oct. 17, 2011, 44 pages.
VisualDNA Products, "Highly personalized dynamic creative", <http://www.slideshare.net/visualdna/visualdna-products>. published May 3, 2011, 5 pages.
European Patent Office, Extended European Search Report, EP Patent Application 12797069.7, dated Oct. 2, 2014, 7 pages.
International Search Report and Written Opinion for PCT/US2012/41178, Applicant: Nfluence Media, Inc., dated Aug. 17, 2012, 6 pages.
International Search Report and Written Opinion for PCT/US2013/32643, Applicant: Nfluence Media, Inc., dated Jun. 7, 2013, 10 pages.
Mital, Vijay. U.S. Appl. No. 12/759 097, filed Apr. 13, 2010, "Applying a Model of a Persona to Search Results," 56 pages.
Willcock, Alex. U.S. Appl. No. 11/227,255, filed Sep. 16, 2005, "System and Method for Response Clustering," 25 pages.
Willcock, Alex. U.S. Appl. No. 12/294,934, filed Sep. 28, 2008, "System and Method of Segmenting and Tagging Entities Based on Profile Matching Using a Multi-Media Survey," 182 pages.
Screen shot of Zite 2.0 application, access date unknown, 5 pages.
Roundtree, Brian. U.S. Appl. No. 13/843,270, filed Mar. 15, 2013, "Reverse Brand Sorting Tools for Interest-Graph Driven Personalization," 124 pages.
Allan et al. U.S. Appl. No. 13/490,444, filed Jun. 6, 2012, "Consumer Driven Advertising System," 94 pages.
State Intellectual Property Office of China, First Office Action, CN Patent Application 201280037966.1, dated Jul. 15, 2016, 22 pages.
State Intellectual Property Office of China, Second Office Action, CN Patent Application 201280037966.1, dated Apr. 12, 2017, 30 pages.
Roundtree, Brian. U.S. Appl. No. 14/078,515, filed Nov. 12, 2013, "Consumer and Brand Owner Data Management Tools," 66 pages.
Roundtree, Brian. U.S. Appl. No. 14/280,480, filed May 16, 2014, "Privacy Sensitive Persona Management Tools," 82 pages.

* cited by examiner

Matrix 300

| pop group = '98103' | | | | | | | |
|---|---|---|---|---|---|---|---|
| Rank | Relevance Score | pop pointer | pop name | pop autograph ID | pop Map ID | pop pointer x | pop pointer y | pop URL |
| 5 | 0.83500 | 457 | J.P. Patches Park | 8877AFAE-CC5B-4B6C-97C5-71B963A95197 | 18.3 | 505 | 171 | http:// |
| 6 | 0.80020 | 21463 | J.P. Patches Statue | 4E2724DCD-FD19-44B4-B1CB-E6AEC9155B8E | 18.3 | 488 | 439 | http:// |
| 7 | 0.77860 | 11125 | Waiting for the Interurban | 2F466706-8A28-445E-A6F5-686CD877B2B60 | 18.3 | 377 | 401 | http:// |
| 8 | 0.75230 | 60393 | HOMEGROWN sustainable sandwich shop | 2F9D7795-10A5-408D-A32B-016D32833B097 | 18.3 | 340 | 228 | http:// |
| 9 | 0.59600 | 55817 | Blue Moon Burgers | 33F01B60-31EC-434D-A8D2-5D42EEF894A2 | 18.3 | 442 | 461 | http:// |
| 10 | 0.52860 | 22593 | PCC Natural Markets | 186F1A24-6A60-4257-8352-5DF9FA812346E | 18.3 | 80 | 298 | http:// |
| 11 | 0.50360 | 30729 | Les Amis | 941D1738-9481-4534-8D68-F6D09C8C000F | 18.3 | 53 | 262 | http:// |
| 12 | 0.49920 | 26696 | Essenza | F4D12D57-6B63-463C-BE55-575788980089 | 18.3 | 195 | 124 | http:// |
| 13 | 0.34760 | 61170 | El Camino | F09A2403-E6F8-4335-8EF2-94F7E02EBD76 | 18.3 | 115 | 103 | http:// |
| 14 | 0.34160 | 20522 | Lola Pop | D5CAD682-FF6D-4F75-B39E-59FEBA1D86A0 | 18.3 | 443 | 223 | http:// |
| 15 | 0.13988 | 19114 | Portage Bay Goods | EB163946E-3B1D-4D68-8015-0A25A68C97A7 | 18.3 | 437 | 377 | http:// |

*in the above, "pop" is equivalent to "beacon"

Fig. 3

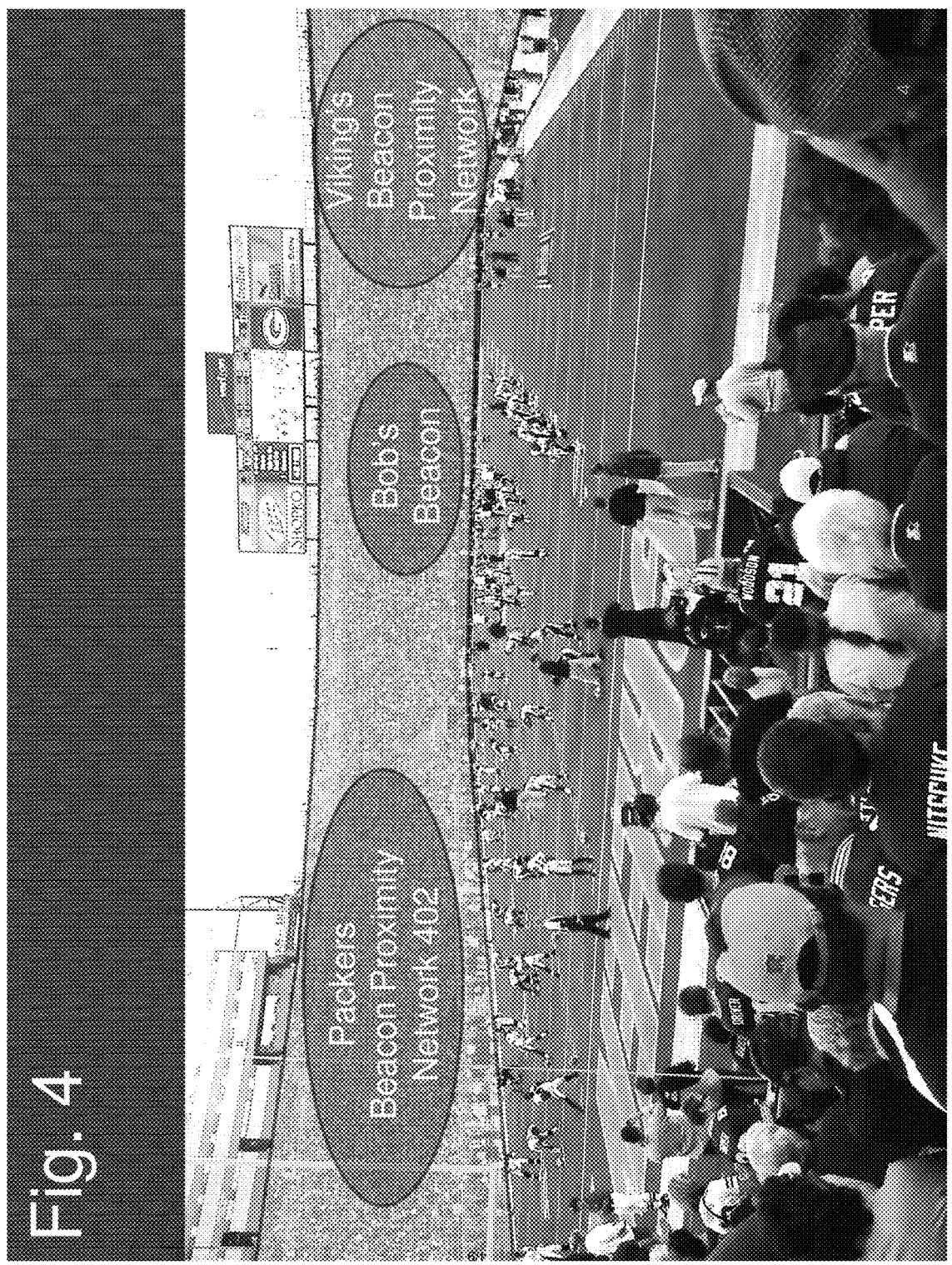

BEACON BASED PRIVACY CENTRIC NETWORK COMMUNICATION, SHARING, RELEVANCY TOOLS AND OTHER TOOLS

CROSS-REFERENCE TO RELATED APPLICATION(S)

This application claims the benefit of and priority to: U.S. Provisional Patent Application No. 61/972,193 filed Mar. 28, 2014, which is herein incorporated by reference in its entirety.

Related Applications: The following previously filed applications are herein incorporated by reference in their entirety:

U.S. Provisional Patent Application No. 61/493,965, filed Jun. 6, 2011;

U.S. Provisional Patent Application No. 61/533,049, filed Sep. 9, 2011;

U.S. Provisional Patent Application No. 61/506,601, filed Jul. 11, 2011;

U.S. Provisional Patent Application No. 61/567,594, filed Dec. 6, 2011;

U.S. Provisional Patent Application No. 61/597,136, filed Feb. 9, 2012;

U.S. Provisional Patent Application No. 61/603,216, filed Feb. 24, 2012;

U.S. Provisional Patent Application No. 61/683,678, filed Aug. 15, 2012;

U.S. Provisional Patent Application No. 61/724,863, filed Nov. 9, 2012;

U.S. Provisional Patent Application No. 61/824,353, filed May 16, 2013;

CONSUMER DRIVEN ADVERTISING SYSTEM, U.S. patent application Ser. No. 13/490,444 filed Jun. 6, 2012;

SYSTEM AND METHOD FOR DELIVERING ADS TO PERSONAS BASED ON DETERMINED USER CHARACTERISTICS, U.S. patent application Ser. No. 13/490,449 filed Jun. 6, 2012;

METHOD AND APPARATUS FOR DISPLAYING ADS DIRECTED TO PERSONAS HAVING ASSOCIATED CHARACTERISTICS, U.S. patent application Ser. No. 13/490,447 filed Jun. 6, 2012;

CONSUMER DRIVEN ADVERTISING SYSTEM, International Patent Application No. PCT/US12/41178 filed Jun. 6, 2012;

CONSUMER SELF-PROFILING GUI, ANALYSIS AND RAPID INFORMATION PRESENTATION TOOLS, U.S. application Ser. No. 13/707,581 filed Dec. 6, 2012;

CONSUMER SELF-PROFILING GUI, ANALYSIS AND RAPID INFORMATION PRESENTATION TOOLS, U.S. application Ser. No. 13/707,578 filed Dec. 6, 2012;

CONSUMER SELF-PROFILING GUI, ANALYSIS AND RAPID INFORMATION PRESENTATION TOOLS, PCT Application No. PCT/US12/68319 filed Dec. 6, 2012;

AD BLOCKING TOOLS FOR INTEREST-GRAPH DRIVEN PERSONALIZATION, U.S. patent application Ser. No. 13/843,635 filed Mar. 15, 2013;

REVERSE BRAND SORTING TOOLS FOR INTEREST-GRAPH DRIVEN PERSONALIZATION, U.S. patent application Ser. No. 13/843,270 filed Mar. 15, 2013;

TOOLS FOR INTEREST GRAPH-DRIVEN PERSONALIZATION, PCT Patent Application No. PCT/US13/32643 filed Mar. 15, 2013;

PRIVACY SENSITIVE PERSONA MANAGEMENT TOOLS, U.S. patent application Ser. No. 14/280,480 filed May 16, 2014; and PRIVACY SENSITIVE PERSONA MANAGEMENT TOOLS, PCT Patent Application No. PCT/US14/38502 filed May 16, 2014.

The technology described in these applications as well as the current application are interoperable.

BRIEF DESCRIPTION OF THE DRAWINGS

FIG. 3 illustrates an embodiment of a data matrix transmitted to a user device in an embodiment of the disclosed technology.

FIG. 4 illustrates an embodiment of a user forming a proximity based beacon network in a football stadium in accordance with an embodiment of the disclosed technology.

APPENDICES

Figure 1:
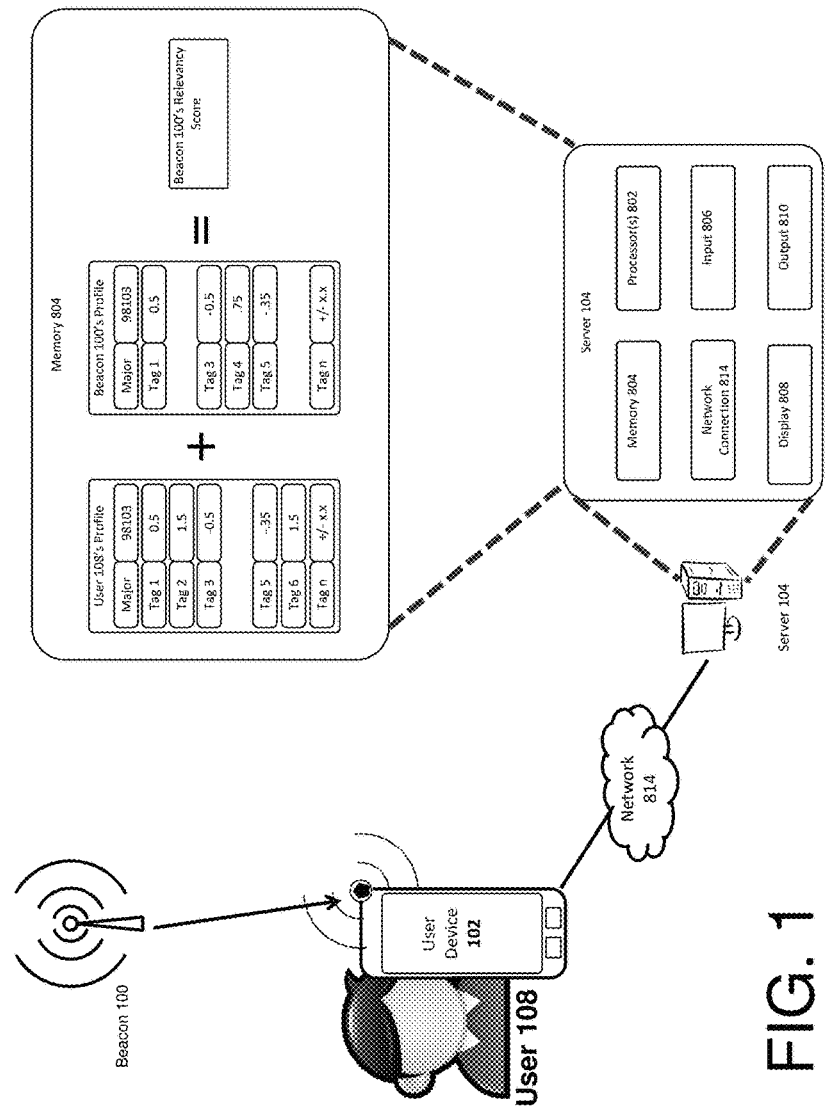
FIG. 1 illustrates an embodiment of the privacy-centric data relevancy tools in accordance with an embodiment of the disclosed technology.

Appendix A has a partial summary description of the technologies described in the incorporated applications.

INTRODUCTION

As will be explained in detail below, the technology disclosed herein relates to:
PRIVACY-CENTRIC DATA RELEVANCY TOOLS; AND
BEACON PROXIMITY NETWORK TOOLS.

BACKGROUND

The proximity of a user to other users and beacons as well as the user's proximity to locations is useful information for personalizing the display of notifications to the user and for making communication between users easier. However, privacy, power consumption and inaccurate methods of calculating what and who is actually relevant to the user plague real life use of these factors.

Thus, what is needed is a method of protecting a user's privacy and conserving battery power while accurately anticipating a user's needs with proximity and profile information and enabling easy communication between users.

DETAILED DESCRIPTION

Tool #1: Privacy Centric Data Relevancy Tools
Introduction: Personalization via Proximity, Beacons and Profiles As will be discussed below, the disclosed tools use a plurality of substantially low powered data signal transmitters and receiving tools, such as beacons to provide a location and contextually aware system. Specifically, the disclosed technology can greatly enhance personalization of information or advertising that is delivered to a user via analyzing the proximity data that is transmitted by a beacon.

The below tools may be implemented via an iBeacon™ (beacons using Apple™ specified protocols and standards), which may include low-powered, low-cost transmitters that notify proximal devices of their presence via Bluetooth data signals/packets.

Personalization may result in a relevancy notification being presented to a user on her device regarding proximal beacons that may be of interest. Relevancy notifications may be based on one or more of interest graphs, social graphs and other profiles such as Advertar profiles discussed in the above referenced patent applications. These profiles may be from profiles of both the user and a proximal beacon. These profiles increase the accuracy of personalizing the goods and services associated with proximal beacons. Such graphs and profiles may include a weighted-graph with characteristic tags as nodes and the associated characteristic tag values as edges (e.g., characteristic statistical probabilities) also discussed in the above referenced applications.

This combination of user and beacon profile data as well as beacon proximity data can be used to anticipate what beacons in a user's proximity (e.g., signal range of a beacon or same clustering of beacons) will likely be of interest to the user. For instance, these tools may calculate a statistical probability (statistical propensity) of what she would like to eat near a detected beacon by calculating a beacon relevancy score of food associated to the detected beacon based upon both a user profile and the beacon profile (e.g., their characteristics and statistical probabilities). The user may then be notified of relevant goods/services/content associated to a proximal beacon. A threshold score may also be optionally assigned so proximal beacons with a substantially low relevancy score will not trigger likely irrelevant user notifications.

Beacons and User Profile Primer

The technology discussed herein may be used with devices capable of transmitting a data signal such a beacon, smart phone or other computing device. A beacon may be a device emitting and/or receiving beacon data signals. These devices may be associated with a profile (Advertar, interest graph, social graph etc.) like construct. The construct may be substantially similar to a profile of a user/offer/ad/content. Specifically as discussed in the above referenced patent applications, a profile may include characteristics/characteristic tags, an associated statistical probability/probability distribution (e.g., propensity) of a characteristic being representative of a user/beacon or certain population of users (e.g., as determined from a consumer survey(s), other marketing data), demographics and other properties. Such an example of a characteristic and an associated statistical probability may be: a 51% chance that the user is a female. Any units or scale may be used to indicate a statistical probability. Beacons may also be associated to profiles. Examples of characteristic tags and associated statistical probabilities are shown in FIG. 1 as residing in memory 804.

In an embodiment of the tools discussed below, iBeacon technology is used. iBeacons use Bluetooth low energy signals to transmit a universally unique identifier and other data that may be received by an iPhone or other nearby computing device having Bluetooth reception capabilities. The received signal data may then be used to associate or otherwise resolve the signal data from the beacon to a preregistered physical location, a profile, specific device, geospatial area, beacon clusters of varying sizes and other data (e.g., beacon characteristic tags and associated statistical probabilities). In addition, the user device that detects the beacon signal may in response to detecting the signal, execute a predefined action such as launch an application and/or notify the user of beacon related information (content/good/services associated with the beacon) etc. Any similar beacon technology/type of signals may be used as well. An iPhone™ or any other suitable device with a transmitter, such as laptop, small watch battery powered transmitted etc. can serve as a Beacon. This includes devices with only a data signal emitter and also those with a data signal transceiver.

The data a beacon sends may be formatted a variety of ways to fit different standards such as the iBeacon standard. The examples below are for the iBeacon standard (e.g., UUID.major.minor), however the same concepts (various levels of beacon grouping/clustering/association sizes and numbers of beacons) may be applied to any standard including Google's Physical Web Project.

In the embodiments below, the iBeacon beacon IDs are comprised of a UUID, major and minor. These are used to represent different levels (such as different numbers of beacons in each of UUID, major and minor) of beacon grouping/clustering. The representation of these variables may be any value including proxy values such as a postal code or nation identifier. Using geopolitical or ownership values as a representation of these values serves as a convenient way to represent/designate clusters of beacons that happen to be in a postal code or nation. The different components of the beacon signal are discussed below:

Beacon Definitions in One Embodiment:

UUID/GUID

A UUID may be the equivalent to a iBeacon's proximityUUID (128-bit UUID or 16 byte string).

Here, a UUID is a code or other identifier that represents a substantially large group of associated beacons (e.g., related by having identical or substantially similar tags). The UUID transmitted may be identical for all these associated beacons. This may be the largest grouping of beacons compared to the major and minor groupings. In one embodiment, a single UUID value may represent all beacons associated to a nation such as the United States.

Major

A major is a code or identifier that may be equivalent to iBeacon's Major (32-bit integer or 2 byte string). Major values may point to specific subset of the UUID beacons.

The beacon major represent a smaller group of beacons made from a UUID grouping of beacons with the same UUID. In a similar manner, they may also share substantially the same tags such as well as the same major and UUID tags. The major beacons may be a larger grouping than beacon(s) associated by a minor. In one embodiment, a major is chosen in which the number of beacons associated with the major is 15 beacons or greater. This substantially improves the privacy of the user when she requests a matrix 400 computed based upon a major (discussed below).

Minor

A minor is a code or identifier that may be equivalent to iBeacon's Minor that is a (32-bit integer or 2 byte string). Minor values point at an individual fixed or mobile beacon. Beacon minors may identify individual beacons that belong to the same UUID and same major. Beacon minors may also belong to multiple UUIDs and majors. In one embodiment, the beacon minor value transmitted is unique to the beacons in the UUID.

Proximity Signals

In the embodiments described below, the exemplary beacon proximity signal is transmitted and received in a non-networked manner. In other words, the reception of the beacon signal by proximal users is through direct reception of the beacon signal and thus limited to the signal range (e.g., 100 meters for some Bluetooth signals) as opposed to transmitting and receiving signals through a network e.g., through the Internet.

Beacon Device Proximity Personalization Embodiment

Figure 2:
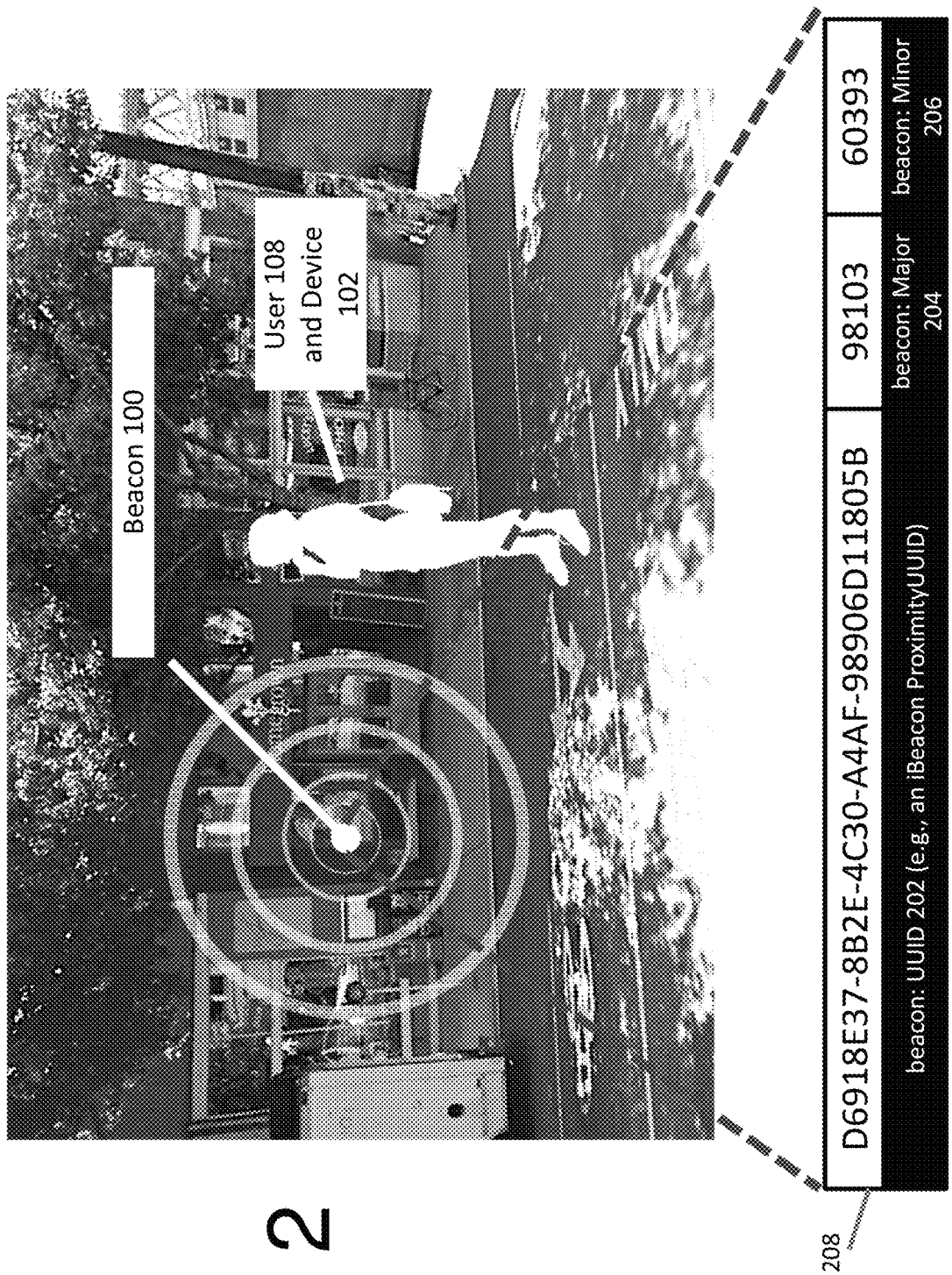
FIG. 2 illustrates an embodiment of data transmitted by a beacon in an embodiment of the disclosed technology.

The embodiment shown in FIG. 1, illustrates a user 108's device 102 detects a remote beacon 100 (an iBeacon) when in proximity to its data signal. FIG. 2 illustrates table 208 which may be what data the user device 102 may detect from beacon 100 via the iBeacon standard. In one example in FIG. 2, the detected data includes: a UUID 202, a beacon major 204 and a beacon minor 206.

As introduced above, the components of the iBeacon signal can explicitly represent data (e.g., a major with the postal code of 98103) or can be resolved to associated data such as a beacon grouping or association. In one example, the beacon minor, the UUID or beacon major each may represent any of: a nation (the United States), a county, a city block, an interest (pizza enthusiasts), a combination of keywords, or any other geographic, location, characteristic or demographic information desired. Each of these may be associated to any size grouping or number of beacons that are associated to these examples.

For instance, in one embodiment, the UUID may represent a country (and refer to beacons associated with that country or geopolitical region). The major may represent a Postal code (e.g., the major refers to beacons associated with that Postal code) or other geographic region. Finally, the minor may represent a unique beacon device (e.g., its serial number). Making sense of this transmitted data (resolving it) may be done by a beacon application on device 102 and/or on server 104 or other device.

FIG. 2 provides an example of how UUIDs, majors and minor groupings are used to represent groupings of associated beacons in a beacon data signal. For instance, a UUID might be associated on a server or a user device with devices owned by the HomeGrown™ Sandwich Shop (a specific user/business). A major may be a Postal code (any geographic area, interest or other characteristic that has beacons in it) and the minor may be a device specific number (device serial number or other identifier) associated with a specific location in a particular HomeGrown Sandwich Shop.

Associations of beacon 100 in FIG. 1 and its properties and characteristics and optional associated statistical probabilities and other data may be made by associating an individual beacon or group of beacons to a profile. For instance, beacon 100 and its beacon signal may have an associated profile on a server indicating that beacon 100 is owned by the HomeGrown Sandwich shop chain, in Seattle (Postal code 98103), at X, Y, Z street address at which the beacon 100 was placed in left hand side of the store by the front window etc.). This would be accomplished by pre-associating beacon 100 data signal component(s) (e.g., UUID/major/min) with the owner/location/clustering information data on a server. In some embodiments, beacons in the same UUID grouping can be associated with the same profile and in another embodiment, beacons in the same major grouping can be associated to the same profile.

In response to the above detection and recognition of at least a portion of the beacon data in table 208 by device 102, the device 102 is preconfigured/programmed such as by an installed beacon application (by downloading a mobile application or may be built within the OS configuration etc.) to send at least a portion of the received beacon data to server 104 in FIG. 1. For instance, transmitting data to the server 104 may be triggered by detecting any combination of the UUID 202, beacon major 204 and/or beacon minor 206 (e.g., one, two or all of these data packets). More specifically, device 102 via the beacon application preconfiguration/programming, recognizes that the UUID from table 208 is a UUID component of an iBeacon signal and it is a UUID that the beacon application is configured to detect and takes action in response to said detection. In addition, the beacon application recognizes the beacon major as a beacon major value. In a similar manner, the beacon minor value may be recognized as a minor. Once these values are recognized and associated as a UUID, major or minor, then the beacon application may perform one or more preconfigured action(s).

For instance, in response to the device 102's detection and recognition of at least a portion of the data in table 208, device 102 may transmit/forward some or all of the detected data from table 208 to server 104. In one privacy centric embodiment, in response to detecting and recognizing Beacon 100's UUID and Major, the installed application on device 102 causes device 102 to forward to server 104 the detected UUID and major.

However, to prevent the server or others from ascertaining the user's precise location, the beacon application may be configured to optionally not send the detected minor from table 208. Thus, server 104 cannot ascertain in what part of the Postal code or nation, the user device is in. In other words, by sending only a UUID (a relatively large group/number of beacons) and a major (A sub-grouping/smaller number of beacons of the UUID group that does not include specific device information), user privacy is preserved. In the example shown, the server 104 only knows the user is in a particular part of Seattle not the exact street address.

Device 102 then receives a matrix 300 in response to the transmission to server 104 of at least a portion of table 208. Matrix was generated by server 104. Specifically, when server 104 receives UUID and major from device 102 it creates matrix 300 by: associating a group of beacons with the received UUID tag (or otherwise associated with the received UUID), then server 104 associates the received major with a subgroup of beacons of the UUID group tagged with 98103. Then server 104 then associates device 102 and/or a profile ID associated to the device 102 to matrix 300.

The server 104 then compiles and transmits to device 102 at least one data matrix 300 for the beacons preregistered/associated/tagged on the server 104 with the same or substantially the same beacon major (postal code 98103) & optionally those beacons also associated to the same or substantially the same UUID and major.

One advantage of associating a substantially large number/grouping of beacons such as matrix 300 in a substantially large area/clustering in a single matrix download all at once to device 102 is power conservation. Specifically, by determining associated data belonging to beacons that are in proximity to beacon 100 as each beacon is detected continually drains the battery of device 102. Here, a substantially large data matrix saves battery power and bandwidth and substantially improves response time to the user.

In one embodiment, matrix 300 includes beacon related profile data for beacons substantially around the geographic area of beacon 100 (e.g., in the same beacon major 204) or otherwise clustered or associated beacons.

Each beacon listed in matrix 300 may be associated with a advertar/profile ID, beacon pointer (e.g., similar to 206 such as a specific device serial number), map ID, latitude, longitude, URL, device application, beacon unique pointer ID, characteristic/demographic tags and associated statistical probabilities (statistical propensities) of these tags being representative of the user or population of users, application tags (tags associated with other applications installed on device 102—discussed below), conditional variables and values such as variable fields (a conditional tag for sunny weather and a field to determine if it is sunny such as an external inquiry to weather.com) and other beacon data associated with a beacon by tags or by other association tools. This data may be used to associate beacons to UUIDs, majors and minors as well as contribute to the calculating of beacon relevancy scores.

Matrix 300 can also have beacon related data is that is related (substantially similar or via taxonomy) to the characteristics of detected beacon 100. Said characteristics may be ownership of beacon 100 (owned by HomeGrown Sandwich Shops, an interest/demographic tag etc.), other users/beacons in the Postal code, other beacons in the same nation, and well as stores, ads, offers, coupons, brands, or anything else in or otherwise associated to major 98103 and/or the data associated to the UUID.

Beacon Relevancy Scores

Matrix 300 may also include relevancy scores or the matrix 300 may be used to calculate relevancy scores for each beacon in the matrix 300 based on user 108's profile. The former may be accomplished by device 102 also transmitting to server 104, a profile ID. This is reflected in FIG. 1, in which a user 108's profile and the beacon 100's profile are used to calculate the beacon relevancy score for beacon 100. Alternately for the latter, the device may not transmit the profile ID and instead may execute the computation locally once it receives matrix 300.

A relevancy score for a beacon matrix 300 is used to determine if user notifications or other actions should be executed. In regards to the computation of a relevancy score, as discussed in the related patent applications, the user's advertar profile may be used with the beacon's advertar profile/interest graph to calculate a relevance/affinity score. The relevancy score may be calculated based on one or more user profile characteristic tags and associated statistical probabilities (propensities) as well as the beacon's profile characteristic tags, and its associated statistical probabilities and other data such as their registered geospatial location, conditional data, distance from user 108 and other data. The beacon's profile is created beforehand and stored on server 104 by the beacon's owner. An example of this is shown in FIG. 1 within memory 804. Specifically, user 108's user profile with a major "98103" and a characteristic (e.g., tag 1) and an associated statistical probability (0.5) may be used with a Beacon 100's profile with a major "91803", a characteristic (e.g., also tag 1) and an associated statistical probability (also 0.5).

For instance, a relevancy score for a plurality of beacons can be based on or be equivalent to a calculated user affinity discussed in the above referenced applications (e.g., calculating a user's affinity for ads etc.). In one embodiment, these relevancy scores can be determined by calculating the distance between the profile vector and the beacon vector, such as their distances in N tag space, beacons can be ranked in order of relevancy/affinity scores. The result of this distance calculation may be a ranked list of beacons in order of affinity/relevancy (i.e. the distance between the vectors) for a particular persona vector-as in matrix 300. Many other methods to calculate relevancy and/or affinity scores are contemplated.

In another embodiment, recomputing received relevancy scores in matrix 300 may be done on either the server 104 or on device 102 in response to new information being added to the server 104 and/or after a specified time interval has passed and/or device 102 is associated with different UUIDs or majors or the user's profile changes. In one embodiment, the server 104 may contact user device 102 and request to send an updated matrix 300 or updated portions of matrix 300. This may then trigger a relevancy score recalculation for some or all of the beacons in matrix 300.

Leveraging the Received Data Table Via Notifications Etc.

The data in matrix 300 can be used in a variety of ways such as selective user notification of substantially relevant proximal beacons. In one example, as device 102 enters into proximity and detects other beacons from matrix 300 (e.g., detects the beacon's UUID, beacon major, minor etc.) notifications such as alerts may be presented to the user. Detection of the beacons in matrix 300 may be by operation of the installed beacon application on device 102. In addition, the use of a user relevancy threshold may keep beacons with a beacon relevancy score below the threshold from triggering a notification to the user. In addition, if a beacon is associated with beacon relevancy score that is over a desired threshold, the user may be notified and/or another action may occur.

The notification actions may be defined in Matrix 300 as well as additional notification trigging conditions. Examples may be to display content (as defined in Appendix A) to the user such as ad, play a sound, vibrate the device 102 or a combination of these that are associated to the detected beacon. Actions to be taken can be specified in Matrix 300. For instance, a notification of an ad associated with a detected beacon, current inventory/content update related to the beacon (requested from a server in response to detection of an associated beacon). The presented content may be pre-cached on device 102 or retrieved in response to the reception of matrix 300, or retrieved in response to an associated beacon defined in the matrix being detected and optionally the threshold and other conditions being determined as true or false.

In yet, another example, a URL or pointer in matrix 300 associated with the detected store/user beacon (e.g., stored in FIG. 3's matrix) may be executed/displayed when in the user comes into proximity and/or detects a beacon listed in matrix 300 and optionally if a beacon relevancy threshold is met.

In another example in response to detecting a beacon, which optionally meets a beacon relevancy threshold, an application installed on device 102 may execute on device 102 via instructions specified in matrix 300. In another embodiment, in a similar manner, a message may be displayed suggesting an application associated with a detected beacon be downloaded from the iTunes™ store if not already downloaded.

In another example, upon detection of a beacon data signal specified in matrix 300, the user may be notified or other actions taken when the detected beacon signal is no longer detected by device 102, or after spending X minutes in the presence of the detected beacon signal.

In other examples, various actions like the above, may be contained in matrix 300 and executed by conditional events or variable/values occurring after a beacon is detected. Such conditionals may be associated to a beacon in matrix 300 and may include: user device 102 entering a map coordinate, detection of another different beacon data signal UUID, major and/or minor, GPS or cellular radio determined geospatial position, a certain weather condition, time, new event, sale of goods date, holiday, or other events. In one embodiment, once the beacon is detected and an associated conditional event is determined to exist in matrix 300, device 102 may determine if the conditional event is true or false or meets a certain desired value e.g., request an update from a URL contained in matrix 300 to determine the weather conditions, time, if seats in the restaurant are open, request an update for inventory etc. If the conditional event is met and the beacon relevancy threshold met as well, then the desired actions in matrix 300 may be executed.

The user relevancy thresholds discussed above may be calculated a variety of ways. For instance, the user relevancy threshold may be a number or range of values set by the user. For instance, the user may wish to see only notifications with a beacon relevancy score of 4 out of 5 stars etc. In another embodiment, the user relevancy threshold may be adjusted by the server 104 and/or the developer of the beacon application. Both beacon relevancy and user relevancy thresholds can take numerical or any other values or units desired e.g., value between 1-100 or −1 to 1 etc.

Other Embodiments that Leverage the Received Data MATRIX

Another embodiment leverages matrix 300 via movement vectors. Specifically, a movement vector is calculated by determining locations of device 102 over a time period and determining a movement vector of user device 102. This movement vector can be used to make relevancy notification to the user. Various location determinations of the user's device may be based on the changing location information regarding the detected beacons via Bluetooth signals or location information determined by Wi-Fi, cellular signals and/or GPS signals. These locations can be used to determine the movement vector and predict its future path.

Beacons from matrix 300, that are projected or determined to be in substantially close proximity (e.g., 10 meters or other desired distance-an exemplary proximity range value) to the movement vector or in the path of the movement vector may be assigned a higher relevancy or a lower threshold in contrast to matrix 300 beacons not in substantially close proximity to the movement vector.

In another embodiment in a similar manner to the above, additional data related to certain beacons in matrix 300 can be downloaded from server 104 and cached based on a movement vector. Specifically, based on a movement vector, beacons in the substantially close proximity of the movement vector or even in the path of the movement vector can be determined and additional data related to these beacons can be pre-downloaded from server 104. The additional data may be obtained by contacting URLs or executing other actions as specified in matrix 300. This is done to pre-cache information that can supplement matrix 300 information before the user may need the information.

The matrix 300 may be leveraged by other applications different from the beacon application, which was used in the above embodiments to preconfigure the device to execute the steps above (e.g., other applications downloaded from iTunes on device 102). In one embodiment, matrix 300 is contained within the beacon application. Specifically, said applications may also share data with matrix 300 and/or the beacon application. Sharing data with other applications may be enabled via configuration of matrix 300 with conditional variables and application tags to be executed upon certain conditions such as a request by another application etc.

In one embodiment of the above, an application (the "OpenTable™ application") which is designed to determine if tables at restaurants are currently available is installed on device 102 in addition to the beacon application discussed above. The OpenTable application may be configured to determine the current values of variables in matrix 300 which have been associated with beacons in matrix 300 and then communicate tags and associated values such as conditional values to the beacon application and/or matrix 300 on device 102.

In one example, in response to a request by the OpenTable application, the above discussed beacon application may receive tags and associated values from the OpenTable application such as a number of open seats or sunny deck seating availability. The beacon application may add them to matrix 300 and make a request to a server 104 and in response to the addition of this information, determine a new relevancy score for the beacon associated to the received data and/or get additional/updated data. The beacon application may also be configured to request the data above from the OpenTable application.

In one embodiment, in response to the beacon application receiving that only three restaurants in matrix 300 has available seating, the other restaurants without available seating may not be presented to the user at all given the substantially low relevancy score may be assigned to these beacons upon rescoring of the beacons.

In another embodiment users can receive notifications to avoid other users using devices configured as beacons if the profile associated with the device has a substantially low relevancy score. This entails taking actions based on substantially low beacon relevancy scores (e.g., beacon relevancy scores 2 times below average relevancy score and associated with a user device). For instance, a beacon relevancy score a second user device which is configured to act as a beacon (e.g., emit a UUID, major and/or minor) with a low enough relevancy score may indicate that the user of device 102 "hates" or other wise wants to avoid the user of the second device. When in substantial proximity or when the other device's signal is detected or when the second device is in the path of a movement vector of device 102, a notification to device 102 can be made which may display a name or other identifier associated to the second beacon e.g., "avoid from your ex-spouse" (if the user of the second device is associated with an ex-spouse) can be executed. These actions and thresholds may be defined in matrix 300.

In another embodiment, matrix 300 and the profile may be enriched with user input regarding notifications displayed to her. Specifically, a user notification may request an input of "like" "not like" or other user affinity. These affinities can weigh associated beacon information and profile information for data in matrix 300 as well as for both the profile of the beacon associated with the notification and the profile associated with the user entering the affinity. In one example, in a manner similar to that discussed in the above referenced patent applications, in response to a user affinity in response to the display of a notification, associated tags and statistical probabilities that are associated with the beacon are used to update to the user's profile e.g., update weights and statistical probabilities of characteristics in common with the user profile. Matrix 300 and its beacon relevancy scores may reflect these changes based upon the user's updated profile data and/or may include weights based off user notification affinity inputs.

Other Proximity Beacon Network Embodiments

Data associated with a beacon and user device may have at least the following related information: specific device ID e.g., user's phone IP/MAC address/phone number, association of the device (e.g., restaurant/store's devices), associated location (e.g., beacon is in the left and corner window of a Wal-Mart™), IP/MAC address and/or latitude and longitude coordinates; fixed location type: fixed—e.g., (e.g., street address of the restaurant with the iBeacon); mobile location type:—e.g., user's mobile phone location with periodic updates, phone number, email; an Interest/preference/social-graph (e.g., an autograph/advertar profile on a server) which may include characteristics associated to the profile as well as an associated statistical probability (e.g., 62% that the user of the profile is a male etc.), a profile ID, actions such as applications to open and/or URLs to open, conditional variables and values etc. These associations may be located on the user's device, on a remote server or a combination of the above. These associations may occur in data matrix 300 and/or in a beacon or user profile. As discussed above, user devices may be configured as beacons. As such, the above may be associated with a user profile.

In an embodiment of the above tools, a device user like user 108 and his device, who has his device configured to respond to detected beacons (e.g., by downloading the above beacon application) and their associated beacon information or other information may be included in matrix 300 (e.g., a user can also be treated like a beacon in the above disclosure). Specifically, the installed beacon application is preconfigured to transmit a beacon profile ID, major and/or minor and optionally as well as various tags to server 104 upon installation of the beacon application. The user device may then be subject to the same steps above for any of the beacons discussed above.

The individual steps discussed in the above disclosure may occur on the device 102 and server 104, or may be executed on any combination of the devices. For instance, the relevancy score calculation may occur on either or both of the devices. In addition, the use of an application on a mobile device e.g., a beacon application on iOS is contemplated, as such, in one embodiment, when the device detects a beacon or other signal or user input, an indication may be sent to the beacon application to indicate detection or user input.

Tool #2: Beacon Proximity Networks

Background

As discussed above, beacon technology allows easy sharing of information between devices. It is especially useful to share information between proximal device users. However, privacy may be compromised when communicating directly with other user devices, which may reveal sensitive information such as a phone number or email address. Exchanging and inputting such information into a smart phone or other device can also be inconvenient and time consuming.

Thus users need the ability to easily and anonymously share and communicate information with other users in proximity to them. Specifically, what is needed are tools to allow users to easily start and join user networks with other users in proximity to them via a proximity network.

Tool Summary

Disclosed herein are tools for a user to create and/or join a proximity based beacon network with her iPhone™ or other computing device while maintaining her privacy and control over her content such as pictures, texts, video data, emails and other data.

Specifically, the tools described below allow users to join a proximity network based upon a detection of an organizing user's beacon signal (a beacon ID). Specifically, the detected beacon signal from the network organizer's device is received by the user wishing to join the network. The prospective user's device is preconfigured to transmit a portion of the detected beacon signal to a server. The server then issues the prospective user its own anonymous beacon ID. Once the prospective user joins the network, her device is configured to communicate with other beacon network members through a beacon data server. The organizer and joining user device may then communicate without direct communication to each other e.g., share and communicate data through intermediates to preserve privacy. This sharing can be done anonymously and with the users maintaining control of her content via content permission settings on the beacon data server. In another embodiment, communication between users may be in a direct manner.

Proximity Network Overview

FIG. 4 illustrates an environment where an embodiment of the disclosed tools above would be especially useful. Here, in a crowded football stadium, a Packers football fan (acting as a proximity network organizer) in the sports stadium has chosen to start a proximity network 402. Specifically, the Packers beacon proximity network 402 was created as an anonymous proximity event network to enable data sharing while preserving privacy of the organizer and joining users.

To form network 402, the organizer via his Apple iPhone™ or other mobile computing device forms the network by requesting an anonymous Beacon ID from an ID server (not shown). In response to receiving a beacon ID from ID server 504, his mobile computing device starts to broadcast a beacon ID which may be comprised of a UUID, major and minor from her phone via Bluetooth Low Energy signal (e.g., via the iBeacon standard). Other devices in proximity to the organizer's device (in signal range) may be programmed to detect and recognize the organizer's beacon ID after downloading an application (e.g., from Apple iTunes Application Store). Thus, the beacon ID serves as a tool to let proximal users discover the beacon proximity network.

The new users join the proximity network by detecting and recognizing at least a portion of the beacon ID broadcast from the organizer. The prospective member's device is configured to recognize that the detected beacon ID represents a network. In response, a request to the ID server for the prospective member's own anonymous network Beacon ID is made to ID server 504 and received. Users then can pass their anonymous beacon IDs directly to a beacon data server 518 for data sharing and communication with other network members.

Further interactions between users of the proximity network may be done through indirect communication tools such as anonymous IDs and intermediary devices e.g., the anonymous beacon ID and the beacon data server acting as intermediates (e.g., privacy buffers). The trusted beacon data server 518 allows sharing of data and communication indirectly between users (no direct communication link between user devices) using the anonymous beacon ID as a mask to protect user privacy.

Optionally, the anonymous beacon IDs have conditional variables/values/tags to help preserve user content privacy and control of the content they choose to share via beacon data server 518. These conditionals may control the ability to communicate between users as well as control content permissions. For instance, when the users leave the football game (leave the substantial proximity of the geographical point of network creation or substantial proximity of the network organizer etc.) and/or when a lease associated to their assigned Beacon IDs expires, or the user's profile changes in a predefined manner, their beacon IDs will be revoked/discarded or otherwise disabled and users who were members of said proximity network may not be able to identify other users or optionally initiate further communication with them given the use of the anonymous beacon ID. Also as a result, the revocation of the beacon ID may result in different permissions to shared content on the beacon data server.

Figure 5:
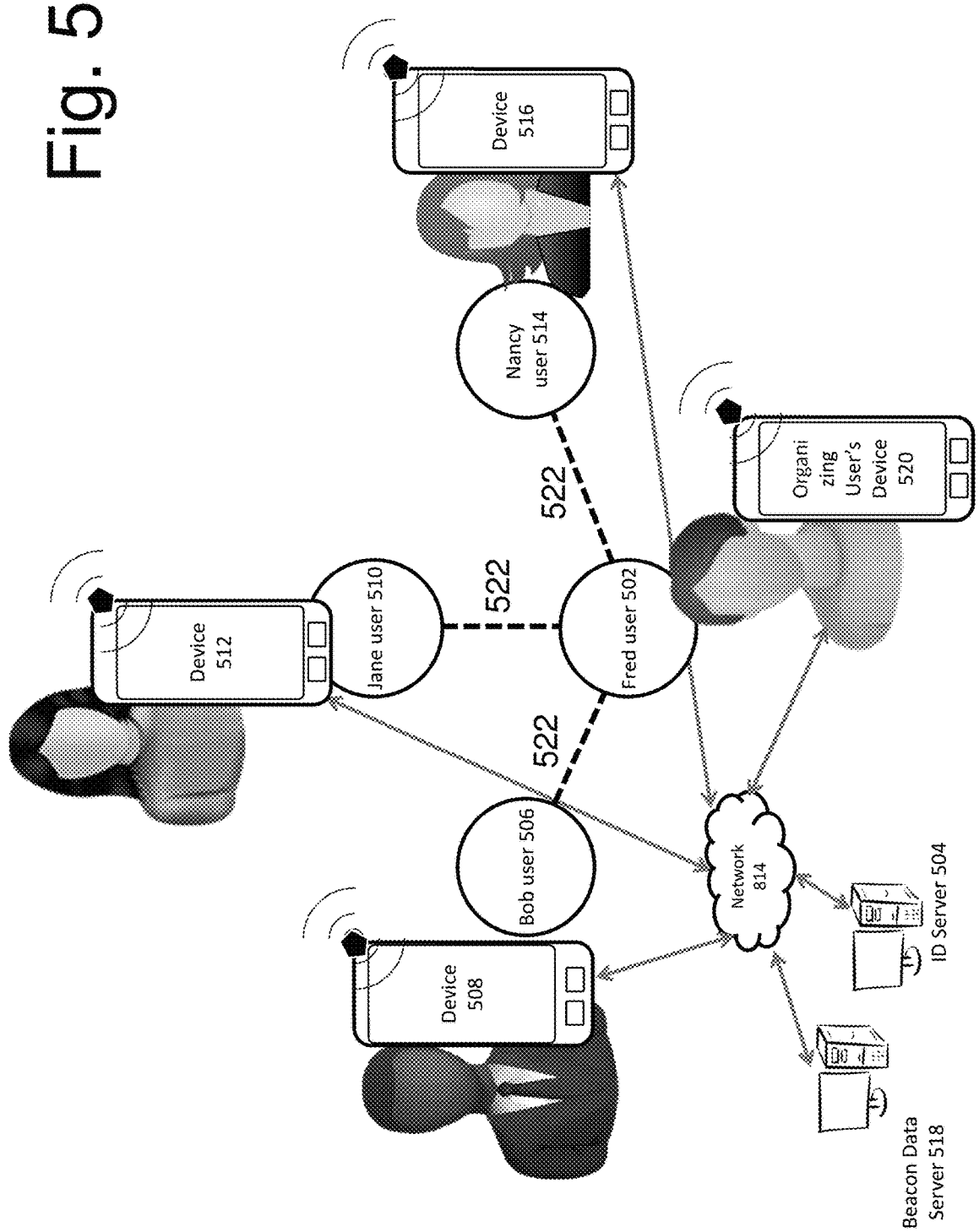
FIG. 5 illustrates an embodiment of a beacon network organizer forming a proximity based beacon network with other users in accordance with an embodiment of the disclosed technology.

Organizing a Proximity Network, Beacon ID Components, Permissions and Restrictions FIG. 5 illustrates an embodiment of a proximity network, whereby a user organizes a proximity network. This user may be called an, organizing user 502 with mobile computing device 520. The organizing user 502 is a user who initiates a beacon proximity network and transmits a beacon ID (e.g., connection identity) for prospective proximal network joiners to discover and join his proximity network.

To acquire a beacon ID, user 502 may contact ID server 504 via a wireless communications link. ID server 504 is configured to generate, manage, associate and transmit iBeacon IDs (e.g., UUID.Major.Minor) to user devices. Beacon IDs may be comprised of any type of data such as a UUID or a GUID, appended or otherwise associated with a substantially large identifier to supplement the UUID for individual user identification purposes. In one embodiment, the UUID is used to trigger a potential beacon network joiner's to recognize/associate (via an installed beacon application on their phone) that a proximity network is available to join. Beacon IDs may be tokens or any code as well. In one embodiment, the beacon ID is created based off a portion of a detected beacon signal (e.g., UUID, major, minor from a member of a proximity beacon network). In another embodiment, the beacon ID is substantially random. In one embodiment, a Beacon ID is created based off of a pointer associated to a detected beacon signal. In yet, another embodiment, the beacon ID does not contain the UUID or any portion of a detected UUID, major or minor. In another embodiment, the beacon ID is comprised of a substantially similar UUID that a joining user detects and includes with her request to ID server 104 to joining the network. The remaining major and minor values may be configured as a substantially unique identifier.

In one embodiment, a major and a minor are appended to the UUID not only to help facilitate communication over the iBeacon standard but aide in substantially identifying a user device. Entire beacon IDs or individual components of a beacon ID such as the major and/or minor may be disposable and substantially unique (e.g., dynamic tokens or dynamic codes). In one embodiment, a server may constantly use the same or substantially similar UUIDs for a group of users while issuing substantially random/anonymous combination of the major and minor values associated to the said UUIDs. Thus beacon IDs can also serve as dynamic IDs to protect privacy.

Once the organizer 502 receives the beacon ID from ID server 504 over network 814, her iPhone or other computing device then transmits the received anonymous beacon ID through a non-networked communication tool such as a Bluetooth signal from her device's transceiver. Thus, other user's computing devices may detect this beacon ID when in sufficient proximity to the signal service. In one embodiment, this transmission of the beacon ID is via Low Energy Bluetooth signal and the iBeacon protocol. This and the other steps described may be enabled by a preconfigured application, that is installed on the user's device (e.g., from an application program from the iTunes Store).

In one embodiment, after ID server 504 receives a beacon ID request (which may include the user's profile ID) from device 520, the ID server may then return, store and/or forward (forward to another server) one of the below pieces of data or any combination of one or more items the below data which is associated to the returned beacon ID for user 502:

a. UUID.Major.Minor (e.g., beacon ID) or any substantially equivalent identifiers can be used of any byte size via any communication standard such as the iBeacon standard b. Beacon ID Lease Grant Time Period c. Country code or other geographic/geopolitical/postal code or other code representing a group of associated beacons (e.g., beacon is active if the user device is in the country code)

d. User content permissions settings e. User communication permissions (e.g., which other detected proximal users that may communicate with user 502.)

f. Conditional variables/values/tags/events

The one or more of the above pieces of data may be associated with the beacon ID by the organizer's device and/or the ID server 504. In one embodiment, the above values may not be returned with the beacon ID but transmitted to the beacon data server 118 and enforced as discussed below by beacon data server 118.

Examples of the enforcement of conditional restriction variables include: instance, time, geographical restrictions and user proximity restrictions can be invoked with data and communication permissions associated with the beacon ID, the user profile ID. For instance, at the end of a time interval, the beacon ID may be configured to expire and the device 520 may stop using the beacon ID. Alternately, ID server 504 may be configured to stop recognizing the beacon ID upon certain conditions. Finally, if a user transmits or otherwise uses the beacon ID despite the expiration or revocation, ID server may be configured to not recognize the beacon ID. Enforcement and storage of the above beacon ID associations and restrictions may be done by various devices.

Users Joining a Proximity Network.

FIG. 5 also illustrates three users proximal to the organizing user 502's device 520. The three users wish to join a proximal network created by the user 502 in response to detecting user 502's beacon signal. Said detection is represented as 522. When one of the three devices proximal to the organizer user (such as device 508) detects the organizing user 502's newly assigned beacon ID above via 522, he may choose to join the network as well. Detection and recognition of user 502's beacon ID by a proximal user is enabled by the proximal user installing a beacon application on their computing devices (e.g. from iTunes etc.). The beacon application may be configured to recognize components of a beacon ID (e.g., UUIDs or GUIDs) or other components of a beacon ID and any other desired identifiers.

In FIG. 5, joining users 510, 514, 506 and their respective devices 512, 516 and 508 detect the beacon ID being broadcast by organizer device 520. Detection occurs when in signal range (proximity) of the organizing device 520's beacon ID transmission, which may be Bluetooth range or other type of signal that may be a non-networked communication link.

In the example shown, joining user's device 508 detects the organizer's beacon ID from organizer device 520, which may include a UUID.major.minor of the organizing user 502's beacon ID. The installed beacon application on device 508 is preconfigured to detect signals with a predefined UUID. Device 508 is further preconfigured to transmit all or a portion of the detected Beacon ID (or generate and transmit new information based on at least a portion of the Beacon ID) from device 520 to the ID server 504 via a wireless link e.g., cellular or Wi-Fi link. Specifically, this may include any combination of the UUID, major, minor from the organizing user 502's beacon ID signal. In addition the request to the ID server 104 may include the profile ID of the prospective network user 506 or device identifier associated to device 508 (discussed below).

In a manner similar to issuing the organizer's beacon ID discussed above, ID Server 504 may receive the request from device 508 and generate and associate and/or transmit a beacon ID to device 508 with or associated to any desired conditional restrictions. The beacon ID generated for device 508 is different than the detected beacon ID from device 520.

Once device 508 receives the beacon ID, the device may join the network. In this embodiment, joining the network is automatic. In another embodiment discussed below, the joining may be conditioned on the joining user and/or on organizer approval to join the network. In one embodiment, the user is allowed to join (or an organizer is allowed to grant permission for a user to join) based on a measure of the determined interest affinity of the organizer and/or the user etc. An analysis of profiles and other information associated with device 508 and 520 is used to determine an interest, affinity, relevance etc.

The specific network for device 508 to be associated to with its newly generated beacon ID may be chosen by the ID server 504 based on the data transmitted by the joining user's beacon ID request. Specifically, since the joining user's request comprised information from (or at least based on) the organizer's 502 beacon ID, then the joining user's beacon ID will be associated to the network created by the by organizer 502. In other words, a joining member will be assigned to a network based upon the data the joining user's device detects (e.g., an organizer or other network member's detected proximal beacon ID) and transmits to the ID server 504. The data the joining user detects may be used as a base to create her Beacon ID.

The beacon ID generated for device 508 may be associated with restrictions. Said restrictions may be defined by the proximity network organizer 502 or an administrator of the ID server 504, the user 506 or any combination of these. The restrictions may be similar to the restrictions for the organizer's beacon ID discussed above (e.g., lease period etc.). The beacon ID may be also associated with the profile that is associated with the device 508 or even to device information itself such as a MAC address, IP address, software ID etc.

The beacon ID transmitted to device 508 may itself contain any values that aid in identification but typically, it will have an identical or substantially similar UUID as that received from the organizer's device 520. This common UUID identifier may assist in other prospective network members detecting and joining the same network via their installed beacon application. Specifically, the beacon applications downloaded on the prospective user's devices may be configured to recognize that specific UUID to trigger the steps above. Each of the newly joined members may then broadcast their beacon IDs with the same UUID. This will let other prospective network members recognize that a beacon proximity network is available to join. Members who detect the newly joined member's beacon ID may be directed via the steps above to join organizer 502's network.

In addition, the major and minor or other equivalents used in the beacon ID may be comprised of a substantially randomized value to serve as an anonymous token/identifier/code for device 508, the associated user 506 and/or a profile associated to these. The associations of the beacon IDs to that of profile IDs, particular networks, profiles, software IDs, hardware IDs and other sensitive information is masked by said beacon IDs which are optionally kept private and away from other proximity beacon network users and even optionally, the organizer.

In one embodiment, a user may need approval to join a beacon proximity network. Specifically, profile IDs from a beacon organizer and/or prospective network members may be transmitted to an ID server or other device as part of to a request to join and/or automatically upon detection of recognized a beacon ID signal. A relevancy score may be determined between the user and organizer profiles or even a profile for the proximity beacon network (similar to that in FIG. 3) and if an optional relevancy threshold is met, steps are taken to automatically notify the prospective member or organizer. Notification may include information from the user profile or the organizer's profile or even information about the beacon's profile (e.g., a Packer's football network or other characteristic). Notification may also include a request for permission to join the network, or it may automatically join the organizer's proximity network if a threshold is met. Permission to join may be asked from the prospective member. Alternately, the organizer may give permission after being informed that another user wishes to join. For example, the organizer of the network may be given notification of a potential joiner of the network and a relevancy score computed or optionally only informed if a relevancy threshold score is met. The organizer may also be notified, asked for permission to let the prospective member join the network or automatically let the user join the network. Relevancy can be calculated on the ID server 502 or a user's device or other desired device.

In another embodiment, the organizer's device 520 may also serve as the ID server 504.

Data Sharing and Communications Between Network Organizers and Network Users

In the above example in FIG. 5, the exchange of a beacon ID and subsequent association to the beacon proximity network was used as a one-way communication tool (e.g. via non-networked communication such as direct signal communication) between devices to help join the users in a proximity network. Upon joining the proximity network, each member can communicate with another member via two-way communication (including networked communication including Wi-Fi, cellular etc.) that uses the trusted ID server 504 and/or a trusted beacon data server 518 as an intermediary. This alleviates the need for direct user-device to another user-device connection for communication and data sharing. Said direct connection between user devices may compromise privacy and security. In another embodiment, the various proximity beacon network users could communicate directly with each other via a peer-to-peer network such as via Wi-Fi instead of or with communication via intermediaries.

In FIG. 5, communication within the members of the proximity network is done with their anonymous beacon IDs serving as privacy buffers/masks on server 504. For instance, as in FIG. 5, once device 508 receives a beacon ID and is associated to the beacon proximity network, further communication such as data sharing, texting, emailing etc., between the new user 508 and organizer 502 is typically done directly with beacon data server 518 (not shown) instead of directly between device 508 and device 520. Switching to networked communication via intermediaries may be by operation of the installed beacon ID application on the user's device when he receives his beacon ID. In one embodiment, the installed beacon application on the user's device communicates with an intermediary by sending her beacon ID to a URL or other address of the intermediary along with optional data such as content (e.g., pictures, text etc.).

In pursuit of the above indirect communication embodiment between users: upon receipt of a beacon ID, an organizer device 520 and/or user device 508 may each transmit the received beacon ID and the profile ID associated with the respective user to server 518 (as preconfigured by the installed beacon application on the devices). In addition, before passing their beacon IDs to server 518, devices 508 and 520 may associate conditional variables/events and restrictions and their profile IDs to their beacon IDs. This additional information may be transmitted to server 518 or otherwise associated and made available to it as well as to ID server 504 if desired. In another embodiment, ID server 504 will directly generate and communicate associations, conditional variables/events to server 518 as opposed to having individual member devices pass these associations to server 518.

ID server 504 may associate particular networks to users. User association to networks may be done based on information in the prospective member's request to join a proximity network. For instance, since the users in FIG. 5 have all detected the beacon ID from organizing device 520 and in response, included at least a portion of the beacon ID in a request to join said detected network, they will be assigned to the organizing user 502's network. ID server 504 is configured to associate requests containing organizer 502's beacon signal to his particular network because the organizer 502 beacon signal is associated to his network. A tag or other association may be used to represent these associations of each of the user devices, ID server 504 and/or beacon data server 518.

The associations above may be between profile IDs of the network members, user mobile computing devices and/or beacon IDs of the members. To protect user privacy, the associations between beacon IDs may be rendered substantially useless if beacon IDs are discarded (e.g., the lease period on the IDs runs out). However, associations between members via their profile IDs (or device IDs) may persist after their beacon IDs are discarded which may preserve user/device associations that were formed in the beacon network for a later period, which are discussed below for post-network data sharing and communication.

Once prospective proximity network members join a proximity network, data sharing and other communications between members of a proximity network may then be centered around a user's content permissions and permission to communicate with other network members. These permissions may be associated with a member's beacon ID and/or profile ID and/or device ID. Specifically, content and communication permissions may be associated to a beacon ID/profile ID as well as accompanying permissions such as the ability to view, delete, edit, share, copy etc. Content and communication permissions associated to beacon ID/profile IDs may be conditioned: such as the user's beacon ID being valid (lease has not expired), a time interval, the organizer's device of the proximity beacon network (or other members of said network) being currently within beacon signal proximity of a certain geospatial/geopolitical area, the beacon ID with said permissions still being associated to a profile having identical or substantially similar characteristics and/or associated statistical probabilities at the time of data sharing e.g., having identical or substantially similar characteristics at both the times the data or communication is shared and to when the user joined a proximity network. For instance, the user may still have to be associated with a profile having a Packers football fan characteristic and not a Vikings football fan etc. with, and optionally, the characteristic having a substantially large characteristic statistical probability. In another embodiment, the user may simply specify that she is associated with a particular characteristic. The organizer in turn may decide whether to grant permissions/entry into the network based on the stated characteristic.

In example of the above, in lieu of or supplementing a beacon ID lease or other restriction, is a geographic/geopolitical and/or proximity restriction associated to the beacon ID. For instance, the beacon ID and/or communication or data sharing permissions may be configured to terminate or otherwise be restricted upon a conditional event/value/variable occurring. For instance, the beacon ID may terminate, be discarded by the device or otherwise be found invalid by ID server 104 or beacon data server 518 if a network member/device leaves a certain area or proximity (more than 100 meters away from the organizer's device 520 or a substantially large cluster of proximity beacon network users/devices on the same network or at least one member/device of the same beacon proximity network or venue or geospatial network creation point, or other designated geospatial/geopolitical area/coordinate). In other words, the beacon ID and/or associated sharing and communication permissions may be continent upon a member being in constant reception of another member's beacon signal.

Figure 6:
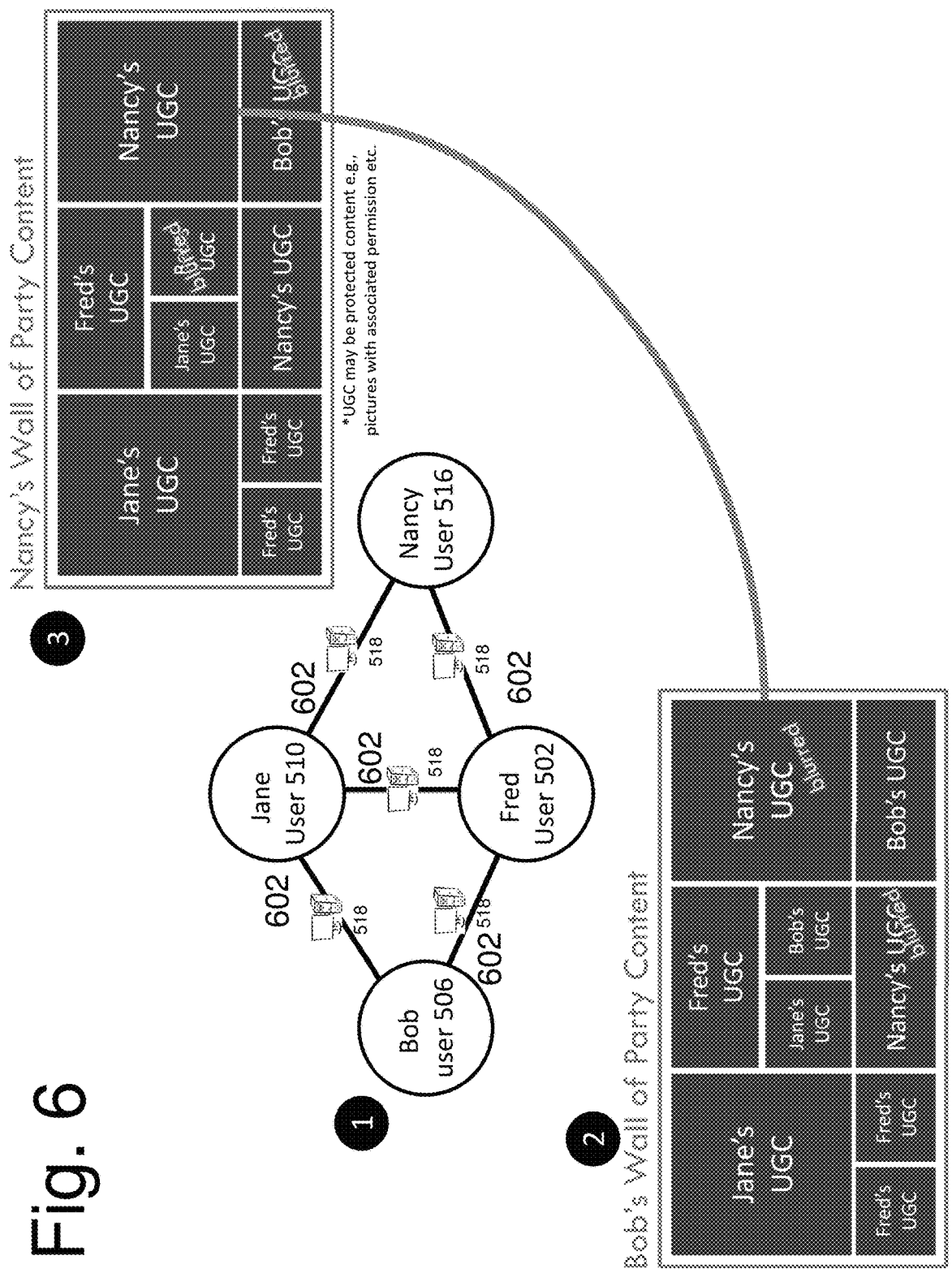
FIG. 6 illustrates users of a beacon proximity network sharing data in accordance with an embodiment of the disclosed technology.

FIG. 6 illustrates an embodiment of time period and user proximity data/communication sharing restrictions. Specifically, FIG. 6 illustrates a proximity beacon network at operation 1 and different "walls" or content menus viewable on a particular user's device at operation 2 and 3. 602 represents network connections between the user devices. In contrast to a one-way non-networked signal detection 522 in FIG. 5, connection 602 represents indirect two-way network communication between user devices using beacon data server 518 as an intermediary device.

The beacon proximity network formed at operation 1 (as introduced in FIG. 5) was formed with a time period restriction in which after a time period, a content owner's content will be restricted from other network members/former members. In FIG. 6, each of the users is currently within proximity to the organizer Fred 502 and his device 520 (not shown) and the beacon IDs and profiles associated with each user/device by the ID server 504 have time and proximity restrictions that are not currently active e.g., each user is within proximity and are within the permitted time interval.

Operation 2 illustrates that since the content restrictions are not active, content is viewable from user 506's (Bob) device. The various users, Jane user 510, Fred user 502 and Nancy user 516 have joined the same beacon proximity network and have made their content available for sharing in a manner discussed in above. This content sharing may occur on beacon data server 518. As such, each piece of content may be tagged with desired permissions.

The content permissions for Nancy 516 and Bob 506 are configured such that content sharing permission must be granted to a user from the content owner for sharing to occur. For instance, in operation 2 and 3, Nancy 516 may be a member of the proximity network, but may not have authorized Bob 506 to view her content however she has authorized sharing with Jane 510 and Fred 502. Here, in operation 3, she may be displayed with "blurred" images to content she may have increased permissions to if she give authorization to permit Bob to view her content. In a like manner, Bob may have limited permissions to Nancy's content. However, once Nancy allows sharing with Bob 506, his content will receive more permissions and in a like manner, Bob will receive the same permissions from Nancy so both can view non-blurred images.

Figure 7:
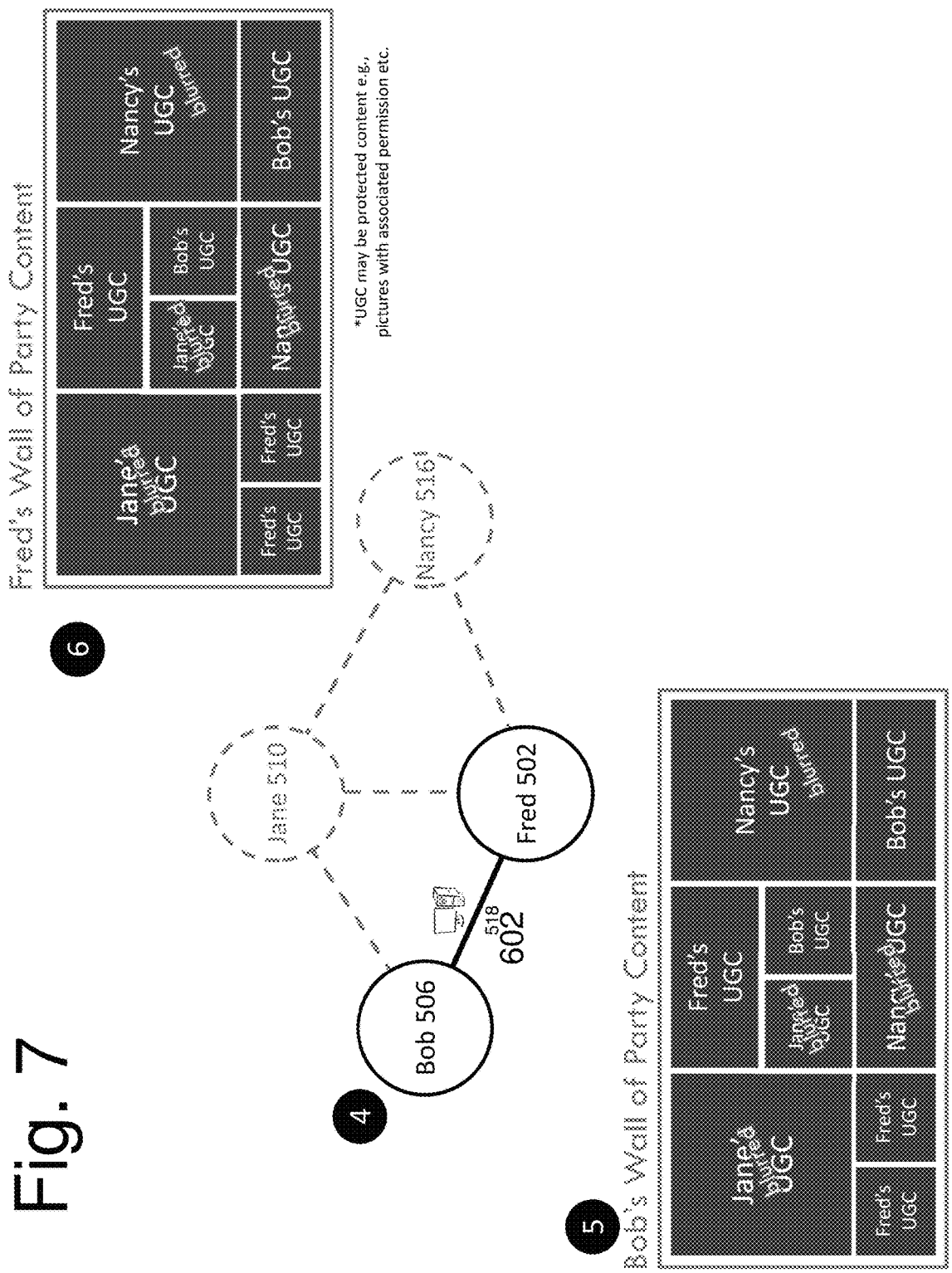
FIG. 7 illustrates an embodiment of user content restrictions of a previously formed beacon proximity network in accordance with an embodiment of the disclosed technology.

FIG. 7 illustrates in operation 4, the users from FIG. 6 but with active content restrictions in response to the passing of a time interval restriction (e.g., after 2 PM, the content and/or the beacon network is terminated or restricted). In contrast to FIG. 6, which illustrates the proximity network connections 622 when each user was in proximity to the organizer Fred 502 during the allowed time, FIG. 7 illustrates the time after which the beacon IDs and/or profile IDs of the members of the network are no longer valid/recognized for purposes of data sharing e.g., their beacon IDs are dissociated from each other. This is reflected in the "blurred" images in operations 5 and 6. In addition, Jane 510 and Nancy 516 and their devices are no longer connected to Bob 506 and organizer Fred 502.

Here, even though the beacon IDs of proximity beacon network members may have been discarded, data sharing and communication is still possible. Specifically, ID server 504, beacon data server 518 and/or the user devices may have recorded the profile IDs associated with the beacon IDs given to the profile IDs of other members in the proximity network. In another embodiment, the users may share a token such as a disposable value to which a profile ID(s) are accessed through.

As such, data between former members of the beacon proximity network sharing may occur with or without a new proximity network being formed (e.g., after restrictions and conditional vales and variables have disconnected one or more users from the network). This may occur by using the associations between the users' profile IDs that were formed in FIGS. 5 and 6.

Also in FIG. 6, each user's content restrictions specified that a user must be in proximity for other users to view his content in addition to the time interval restriction. In the embodiment illustrated in FIG. 7, a new proximity network may be formed between Bob and Fred's devices under the same or similar restrictions. This may occur in a manner similar to that discussed in initially forming networks. Once the network is reformed, Bob and Fred may once again view each others' content in a manner similar to FIG. 6. In addition to receiving beacon IDs and being assigned to the same network, ID server 504 and/or beacon data server 518 may recognize their Bob and Fred's profile IDs have participated in a previously network (that illustrated in FIG. 6). These prior associations may be determined by examining the prior associations between Bob's profile and Fred's profile ID (or other ID like a device ID) that were formed in the FIGS. 5 and 6. Content and permission they previously shared may be associated to the new network, the newly assigned beacon IDs in FIG. 7. This occurs despite the beacon IDs being discarded via the record of user profile ID associations.

As illustrated, since Jane and Nancy's devices are not in proximity, then their content is no longer viewable (e.g., their content restrictions are still active).

In another embodiment, sharing can happen without reforming the network. Specifically, Fred 502 may view Jane's content without her joining the network. Specifically, Fred may submit a request to ID server 104 and/or beacon data server 118. These devices may have a record of Jane's association with the proximity beacon network via its association with her profile ID. Via Jane's profile ID, she may be contacted on her device (a record of her device contact information may be associated with her profile) and asked to share content with a person that she was previously connected to in a beacon proximity network. Jane may then allow sharing with new restrictions without even being in proximity of Bob or Fred.

Various Beacon Proximity Network Tool Embodiments

In one embodiment, ID server 504 may configure or otherwise associate the organizer's Beacon ID as the Beacon ID that originally organized the beacon proximity network. This data may also be associated with user 502's profile. This designation as the network organizer may assign the organizing user 502 with privileges and other permissions over the network and the members that join or request to join the network. For instance, organizer privileges may allow organizing user 502 to terminate a network user ID, impose content/communication restrictions and/or decide if prospective member's may even join (e.g., by first examining their profile/profile ID which may be received by the organizer's device with the request to join the proximity network). The prospective member's profile may be examined by the organizer's device, the ID server or beacon data server for characteristics and statistical probabilities and optionally a relevancy score may be calculated between the organizer's profile or the network's profile and the prospective user's profile (e.g., at least 51% statistical probability that the profile belongs to a Packers football fan etc.)

In another embodiment, data shared via beacon data server 518 may be discriminately shared with different users. Such discrimination may be via tagging or otherwise associating required characteristics and statistical probabilities with profiles of other users. For instance, the organizer or other user may share certain content (via permission) with only with other users whose profiles are associated to Packers football fans or other characteristics. The shared content may be associated with these conditional variables and permissions enforced by any of the devices in FIG. 5.

In one embodiment, users who join an organizer's proximity network may also emit a beacon signal themselves. This beacon signal may be different than the organizer beacon signal, yet still be associated to the organizer's beacon network. Specifically, the joining users (506, 514 and 510 and their respective devices) in FIG. 5 may transmit from their devices, an identical or substantially identical UUID that the organizer's device transmitted. In addition, the joining user's major.minor or other identifier used with the UUID in the beacon ID may associate potential joiners of the network to user 502's proximity network. These associations may occur in response to the ID server 504 associating the detected network member's beacon ID as being associated with the organizer's proximity network and then admitting the new joiners who transmitted the member's beacon ID to ID server 504 to join 502's network.

In yet another embodiment, a user may interact with the beacon proximity network using a dynamic user identity that may be a component of its beacon ID. A dynamic ID protects the user's privacy by preventing association of data such as places they have been or actions they have taken. This is because the dynamic identity (e.g., the major and minor) prevents actions or associations attributed to a single ID (IP address, device ID, profile ID or other ID). The dynamic ID may be rotated at any interval or upon any condition. The relationship between the different dynamic IDs issued to a user/user profile may be kept on her device, ID server 504 and/or beacon data server 518.

In one embodiment, the initial receipt of the organizer's beacon ID was done via a one-way receipt of a Low Energy Bluetooth signal. This may also use the iBeacon standard in which the organizer's device 520 and joining user's device 508 did not pair as normal Bluetooth communication or other networked communication does. In addition, once the devices receive their beacon IDs, sensitive information such as their address and other communication information as well as personal information such as profile IDs, MAC addresses, IP addresses, phone numbers, email address etc., is masked behind the association of the anonymous beacon ID. This beacon ID serves as a mapping of associations to facilitate communication between the proximity network users without compromising their privacy.

Other Representative Embodiments

One embodiment includes: A communication system comprising a computer configured to: receive a request from a mobile computing device associated with a new user who wishes to join a network, wherein the request is based on at least a portion of a first beacon ID detected by the new user's mobile computing device; transmit a second beacon ID to the new user's mobile computing device that is associated to the network; and receive data from the new user's mobile computing device that includes the second beacon ID. Wherein the second beacon ID includes at least a portion of the first beacon ID. Further comprising: receive permission information associated to the new user's mobile computing device; associate the second beacon ID to the permission information; and transmit the permission information to a remote computer system. Wherein the second beacon ID is associated to information that allows the new user to access the network during a limited time interval or only if the new user's mobile computing device is within a proximity range of one or more members of the network. Wherein the second beacon ID was associated to the new user's mobile computing device in response to a detection of an affinity input from the new user's mobile computing device. Wherein the second beacon ID comprises at least a substantially similar UUID to that of the first beacon ID.

Technical Problem Solved

As discussed in this document, the discussed subject matter solves several technical problems. Specifically solved, is the current problem of providing a device that allows nearby users to communicate without compromising privacy. As well as the problem that users have of not being able receive relevant updates of proximal beacons.

Therefore, what is disclosed are enhanced and flexible tools to enable users such as the above to: enhance user privacy by preventing others from obtaining data that can be used to resolve user's position to more than a particular level of accuracy e.g., postal code accuracies. The disclosed technology also allows greater relevancy from user notifications to beacon signals in proximity; allows users to get better battery power conservation from a large downloads of beacons in a given geographical area instead of many smaller downloads; and form more privately and conveniently user proximity networks for better data sharing and communications etc.

APPENDIX A

Persona/Profile Primer

As will be discussed in further detail below, the disclosed technology allows users to use personas/profiles (also referred to as "advertars" or "advatars") to get personalized information such as content, ads and notifications. A persona may be represented as an icon or other symbol that can be selected by a user and has a number of characteristics (e.g. demographic characteristics) associated with it. The demographic characteristics may represent either actual or desired demographic characteristics of the user. These characteristics associated with the personas can be used by advertisers or others to determine a target audience for one or more ads/content etc.

Specifically, the persona's characteristics are matched with ads, offers, coupons, services, products, content recommendations or other similar data. Analysis and matching may be performed by assigning tags and associating statistical probabilities that particular demographics would be interested in the ads/content (e.g., to a profile of its own) or assigning probabilities to existing tags or other data related to the ads/content. Matching may also be performed via the above without the statistical probabilities and focusing on matching via substantially similar characteristics.

The persona may also be associated to items of content (e.g., permission settings such as sharing with other users etc.) such as "ads" and "brands." As used herein a brand can be virtually anything that evokes some sort of positive or negative reaction from the user and which can be correlated to some demographic characteristic. As explained in the incorporated patent applications, a brand may include, but is not limited to, a logo, trademark, animation, text, movies, movie clip, movie still, TV shows, books, musical bands or genres, celebrities, historical or religious figures, geographic locations, colors, patterns, occupations, hobbies or any other thing that can be associated with some demographic information. For instance any thing that can be broadly accepted or recognized by a plurality of users can be a brand. Such examples could be Huggies™ brand diapers, Copper River Salmon™, Microsoft™ software, a picture of Tom Cruise, a picture of a frame from one of Tom Cruise's movies, a musical band name, a musical band album cover, a famous picture such as the picture from Time™ magazine celebrating victory in WWII in which a sailor is kissing a woman, a picture of a house in the country, a picture of a Porsche™ car, a picture of a smiley face, locations (France, Virgin Islands) etc. In addition, brands can be abstract ideas such as "World Peace" and "Save the Whales", political ideologies such as "Republican" or other concepts about which a user may have an opinion can also be brands. As used herein, the term "ad" is to be interpreted broadly and can include promotional materials, rebates, consumer notices, content, political or religious materials, coupons, advertisements (including push advertisements), various kinds of recommendations (such as product/service recommendations, content/media recommendations), offers, content (movies/TV shows) and other information that a user may which to receive.

In one embodiment, the demographic characteristics attributed to a persona are determined based on responses to the user's indicated opinions such as likes or dislikes of a number of brands. As used herein, characteristics may include the demographic characteristics of a population such as (gender, age, location, marital status etc.) as well as properties, characteristics or traits relating to single individual users such as a user's individual interests.

In one embodiment, a persona is implemented as a computer record that represents an address or device identifier to which data can be directed as well as a number of characteristics (e.g. demographic characteristics) that may be input directly by the user or inferred from user input. The aspects of a persona that can be seen by another may not identify the identity of the user such that the advertiser cannot contact the user directly other than by the address or device identifier associated with the persona. In one embodiment, a persona has a graphic icon that represents the persona and a number of demographic tags or categories representing the likelihood that the user falls in that demographic category.

In one embodiment, separate cookies and caches are used for each persona when using a web browser or other computing device. This segmentation of persona information prevents information cross over between personas. In addition, this segmentation gives context to the information in the cookies and caches given that all data is related to the persona's interests. This makes optional analysis of such cookies and caches more reliable since the user's activities only pertain to the selected persona. Optionally, the cookies and caches can be encrypted to protect privacy.

In one implementation, each persona is associated with one or more tags representing different characteristics such as different demographic characteristics. The association may be determined via the brand sorting during persona creation e.g., brand affinity input or any other user input or inferences made from user input. A tag may store or be associated with a value that represents the likelihood (e.g., a statistical probability/distribution such as a propensity) that the demographic characteristic represented by the tag is applicable to a user. For instance, the value of the tag may reflect a probability that the user is male while another tag represents the likelihood that the user lives in New York. Other tags may store values that represent the likelihood that the user has children, likes Chinese takeout food, and votes Democratic etc. In a like manner, user device etc., may be associated to a persona/profile similar to the above.

In one embodiment, a characteristic tag associated to a profile has or is associated with a value representing the likelihood/statistical probability of a user having a defined demographic characteristic. These values for the tags are typically determined from information gathered from the user herself or inferred from the user, consumers who volunteer information about themselves and what brands they like, purchase etc. Such information is typically gathered from marketing data from consumer surveys or a variety of other data sources. The details of associating consumer demographic information with particular brands are considered to be well known to those skilled in marketing. In other embodiments, users may assign a value to a brand by inputting the value itself into the computing device, assigning a relative value to each brand and or tag (brand X given a higher preference to brand Y by giving brand X a location assignment a screen above or to the right of brand Y) etc.

In one embodiment, an ad/offer/content that a persona may be interested in receiving may be matched with the persona based on a persona vector. Typically an ad/offer/content comes with tags such as coffee, sale, spa, dancing lessons etc. (e.g., may be associated with its own persona). Here, an ad/offer/content tag values may be assigned based on marketing data taken from consumer surveys such as a probability distribution that a certain demographic (age, sex, income etc.) would likely desire to receive ad/offer/content with a given tag. The composite of ad/offer/content tag values represent a vector for the ad/offer/content. Each of these ad/offer/content tag values may therefore be considered as an ad/offer/content vector dimension. In one embodiment, tags related to the ad/offer/content tags may be assigned along with their associated values to aid in ad-persona matching.

Once a persona is defined, a plurality of ad/offer/content can be ordered for presentation to the user according to likely persona affinity score. By calculating the distance between the persona vector and the ad/offer vector, such as their distances in N tag space, ad/offer/content(s) can be ranked in order of likely persona desire. The result of this distance calculation may be a ranked list of ad/offer/content in order of affinity (i.e. the distance between the vectors) for a particular persona vector. In this manner, instead of filtering out ad/offer/content, a relative ranking of ads is produced. Alternately, other distances between the ad/offer/content and persona vectors (or any of their components) can be calculated to produce a ranking. Various other methods of filtering and sorting to match the appropriate ad/offer/content to the persona may also be used. In some embodiments, location, past purchases, sale times/items, membership in customer loyalty programs, percentage off and other factors may be used to aid in ad ordering/selection. In one embodiment, the calculated affinity for a particular ad is displayed to the user as stars (e.g., an ad with a highly calculated affinity is four our of four stars etc.). In another embodiment, the ordering/filtering may consider the ratio of the geographic distance to an offer and the percentage off. For instance, if an ad is only 10% off and the distance is several hundred miles from the user, this ad would have a lower ordering then an ad that is 90% off and one mile away from the user. Here, the distance and percentage off etc., may be displayed to the user as well. In yet another embodiment, the persona may keep track of ads that resulted in a purchase by the consumer. After a purchase, the user will not be shown the ad on the persona that made a purchase or on all her personas.

Optionally, the dimensions on the persona vector and/or the ad/offer/content vector can be normalized by multiplying the dimension by a scalar between for instance, zero and one, to prevent particularly strong tag dimensions from skewing the results.

As discussed in the previous sections, the above steps involving user profiles can be applied to beacons and their associated profiles.

Description of Computer Hardware

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Figure 8:
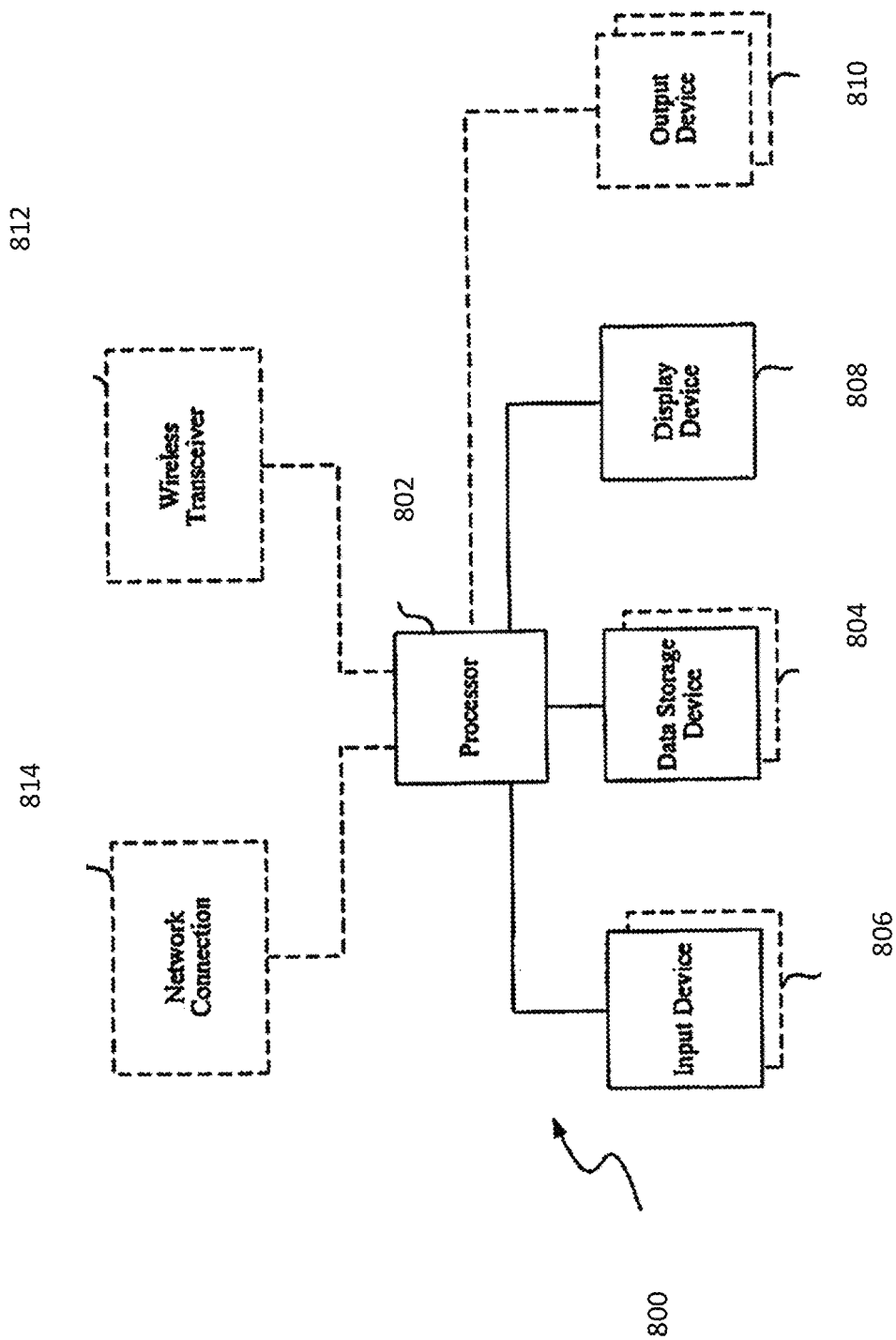
FIG. 8 illustrates a block diagram of a computing device in accordance with an embodiment of the disclosed technology.

A non-transitory, computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing device using data stored on one or more computer-readable storage devices or received from other sources. A representative data processing device is shown in FIG. 8.

The data processing device includes "processor electronics" that encompasses all kinds of apparatus, devices, and machines for processing data, including by way of example a programmable microprocessor 802, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices 804 for storing data, e.g., flash memory, magnetic disks, magneto-optical disks, or optical disks. However, a computer need not have such devices. Moreover, a computing device can be embedded in another device, e.g., a mobile telephone ("smart phone"), a personal digital assistant (PDA), a mobile audio or video player, a handheld or fixed game console (e.g. Xbox 360), a Global Positioning System (GPS) receiver, or a portable storage device (e.g., a universal serial bus (USB) flash drive), to name just a few. Devices suitable for storing computer program instructions and data include all forms of volatile or non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device 808, e.g., an LCD (liquid crystal display), LED (light emitting diode), or OLED (organic light emitting diode) monitor, for displaying information to the user and an input device 806 such as a keyboard and a pointing device, e.g., a mouse or a trackball, track pad, temperature sensor, accelerometer, light sensor, audio sensor, wireless signal detection sensor etc., by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser. The data processing apparatus 800 may also include a wireless transceiver 812 such a cellular radio, Wi-Fi or WiMax transceiver, Bluetooth transceiver and a network connection 814 etc. The data processing device may also include an output device such as a printer 810. In addition, the device may include location sensing devices (GPS etc.), as well as clocks and other circuitry (not shown).

Figure 9:
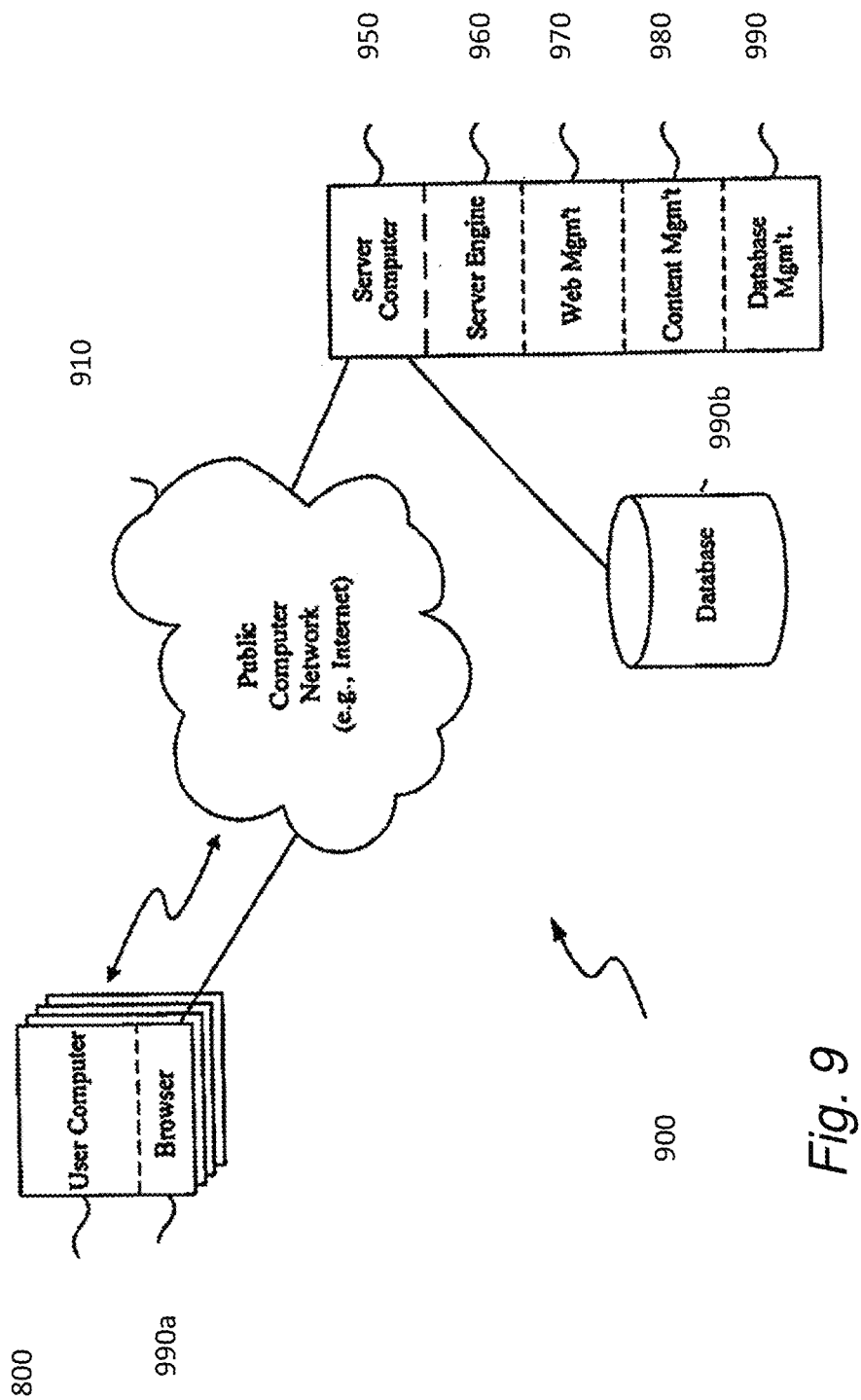
FIG. 9 illustrates one embodiment of a networked computing system used in implementing the disclosed technology.

As shown in FIG. 9, embodiments of the subject matter described in this specification can be implemented in a computing system 900 that includes a back-end component, e.g., as a data server 950, or that includes a middleware component, e.g., an application server, or that includes a front-end component, e.g., a client computer 800 having a graphical user interface or a Web browser 990a through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a wired or wireless local area network ("LAN") and a wide area network ("WAN"), an inter-network 910 (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server 950 transmits data (e.g., an HTML page) to a client device 800 (e.g., for purposes of displaying data to and receiving user input from a user interacting with the client device). Data generated at the client device (e.g., a result of the user interaction) can be received from the client device at the server. In the embodiment shown in FIG. 9, the server computer 950 operates server engine software 960 and web management software 970 to receive data from and send data to remote clients. In addition, the server computer operates a database 990*b* to store persona information for users who wish to receive ads as described above. Content management software 980 and database management software 990 allow the server computer to store and retrieve persona information from the database and to search the database for personas that meet advertiser's criteria for a target audience.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A processor-based system comprising:
   a receiver;
   memory for storing instructions for a mobile device beacon application that are executable by processor electronics;
   processor electronics configured to execute the instructions in order to:
   in response to the receipt of a detection event caused by receiver detection of a beacon UUID and a beacon major transmitted from a beacon, forward the beacon UUID and the beacon major to a remote computer system;
   receive a data matrix based on the beacon UUID and the beacon major, wherein
      the data matrix comprises:
         the beacon UUID for the beacon, a beacon minor for the beacon, a beacon characteristic for the beacon and a beacon statistical probability associated to the beacon characteristic;
   calculate a beacon relevancy score for the beacon based upon a user profile and the beacon characteristic and the beacon characteristic statistical probability, wherein the user profile comprises a user characteristic and an associated characteristic statistical probability;
   determine a movement, vector, of the system based on a geospatial position change of the system;
   recalculate the beacon relevancy score based on the movement vector of the system;
   determine if the recalculated beacon relevancy score is above or equal to a user relevancy threshold; and
   if the recalculated beacon relevancy score is above or equal to the user relevancy threshold, then execute a predetermined action.

2. The system of claim 1, wherein the data matrix further comprises a conditional variable associated with the beacon.

3. The system of claim 2, wherein the instructions further cause the processor electronics to, update a conditional variable value associated with the beacon conditional variable.

4. The system of claim 1, wherein the predetermined action is a notification of a user of the mobile device application and wherein the data matrix further comprises a URL associated with the beacon.

5. The system of claim 4, wherein the instructions further cause the processor electronics to retrieve information from a website associated with the URL in response to the user being notified.

6. The system of claim 1, wherein the data matrix further comprises data associated with a plurality of different beacons, each of the plurality of beacons associated with the beacon major.

7. The system of claim 1, wherein the instructions further cause the processor electronics to project a path of the movement vector.

8. The system of claim 7, wherein the data matrix further comprises a plurality of different beacon minors, at least one of the beacon minors associated to a geospatial coordinate, and the instructions further cause the processor electronics to determine if the geospatial coordinate is substantially near to the projected path of the movement vector.

9. The system of claim 1, wherein the instructions further cause the processor electronics to recalculate the beacon relevancy score in response to a subsequent detection of the beacon minor.

10. The system of claim 1, wherein the predetermined action is a notification of a user of the mobile device application and wherein the instructions further cause the processor electronics to accept user affinity input after the notification is presented to the user.

11. The system of claim 10, wherein the instructions further cause the processor electronics to adjust the beacon relevancy score in response to the user affinity input.

12. The system of claim 10, wherein the instructions further cause the processor electronics to adjust the user relevancy threshold value in response to the user affinity input.

13. The system of claim 1, wherein the instructions further cause the processor electronics to recalculate the beacon relevancy score in response to the passage of a period of time.

14. The system of claim 1, wherein the instructions further cause the processor electronics to recalculate the beacon relevancy score in response to a change in the user profile.

15. A processor-based system comprising:
   a receiver;
   memory for storing instructions that are executable by processor electronics;
   processor electronics configured to execute the instructions in order to:
   in response to the receipt of a detection event caused by the receiver detecting a beacon UUID and a beacon major from a beacon, forward the beacon UUID and the beacon major to a remote computer system;
   receive a data matrix based on the beacon UUID and the beacon major, wherein the data matrix comprises:
      the beacon UUID for the beacon, a beacon minor for the beacon, and a beacon characteristic for the beacon;
   calculate a beacon relevancy score for the beacon at least based upon a user profile and the beacon characteristic, wherein the user profile comprises a user characteristic;
   determine a movement vector of the system based on a change of location of the system;
   recalculate the beacon relevancy score based on the movement vector of the system; and
   determine if the recalculated beacon relevancy score is above or equal to a user relevancy threshold.

16. The system of claim 15, wherein the data matrix further comprises a URL associated with the beacon.

17. The system of claim 15, wherein the data matrix further comprises data associated with a plurality of different beacons, each of the plurality of beacons associated with the major.

18. The system of claim 1, wherein the associated characteristic statistical probability is representative of how likely it is that a user associated with the user profile has a user characteristic.

19. A processor-based system comprising:
a receiver;
memory for storing instructions for a mobile device beacon application that are executable by processor electronics;
processor electronics configured to execute the instructions in order to:
in response to the receipt of a detection event caused by the receiver detecting a unique beacon identifier transmitted from a beacon, forward the unique beacon identifier to a remote computer system;
receive a data matrix based on the unique beacon identifier, wherein the data matrix comprises:
at least one beacon identifier for the beacon and a beacon characteristic;
calculate a beacon relevancy score for the beacon, at least based upon a user profile and at least a portion of data from the data matrix, wherein the user profile comprises a user characteristic;
determine a movement vector of the system based on a location change of the system; and
recalculate the beacon relevancy score based on the movement vector of the system.

* * * * *